(12) United States Patent
He

(10) Patent No.: US 12,520,179 B2
(45) Date of Patent: Jan. 6, 2026

(54) RADIO LINK MONITORING OR BEAM FAILURE DETECTION RELAXATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/068,897

(22) Filed: Dec. 20, 2022

(65) Prior Publication Data

US 2023/0217283 A1 Jul. 6, 2023

Related U.S. Application Data

(60) Provisional application No. 63/266,483, filed on Jan. 6, 2022.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC ....... H04W 4/00; H04W 24/10; H04W 24/08; H04W 16/00; H04W 24/02
See application file for complete search history.

(56) References Cited

U.S. PATENT DOCUMENTS 12,028,809 B2 * 7/2024 Niu .................... H04W 52/0274
12,047,799 B2 * 7/2024 Thangarasa ......... H04W 56/001
2022/0322234 A1 * 10/2022 Niu .................... H04W 52/0274
2023/0396302 A1 * 12/2023 Kazmi ................. H04B 7/0695
2024/0073728 A1 * 2/2024 Niu ........................ H04W 24/10
2024/0080772 A1 * 3/2024 Laselva ............. H04W 52/0229
2024/0196333 A1 * 6/2024 Hu .................... H04W 52/0238
2024/0224103 A1 * 7/2024 Koskinen ............. H04W 24/10
2024/0306057 A1 * 9/2024 Thangarasa ....... H04W 36/0085
2024/0323711 A1 * 9/2024 Li .......................... H04B 17/17
2024/0340802 A1 * 10/2024 Popp ................. H04W 52/0277

FOREIGN PATENT DOCUMENTS

| CA | (63/229740) | * | 2/2023 | ............ H04W 24/10 |
| CA | 3228063 A1 | * | 2/2023 | ............ H04W 24/10 |
| EP | 3952418 A1 | | 2/2022 | |
| EP | 4050932 A1 | | 8/2022 | |
| WO | WO-2020204463 A1 | | 10/2020 | |
| WO | WO-2021078234 A1 | | 4/2021 | |
| WO | WO-2021254590 A1 | | 12/2021 | |

OTHER PUBLICATIONS

International Search Report and Written Opinion—PCT/US2022/082145—ISA/EPO—Mar. 20, 2023.

* cited by examiner

*Primary Examiner* — Mong-Thuy T Tran
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, configuration information including an indication of relaxation criteria and one or more relaxation parameters associated with radio link monitoring (RLM) or beam failure detection (BFD) relaxation. The UE may apply RLM or BFD relaxation in accordance with the one or more relaxation parameters based at least in part on a determination that the relaxation criteria are satisfied. Numerous other aspects are described.

30 Claims, 12 Drawing Sheets

RADIO LINK MONITORING OR BEAM FAILURE DETECTION RELAXATION

CROSS-REFERENCE TO RELATED APPLICATION

This Patent application claims priority to U.S. Provisional Patent Application No. 63/266,483, filed on Jan. 6, 2022, entitled "RADIO LINK MONITORING OR BEAM FAILURE DETECTION RELAXATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio link monitoring (RLM) or beam failure detection (BFD) relaxation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include memory, one or more processors coupled to the memory, and instructions stored in the memory and executable by the one or more processors. The instructions may be executable by the one or more processors to cause the UE to receive, from a network node, configuration information including an indication of relaxation criteria. The instructions may be executable by the one or more processors to cause the UE to transmit, to the network node, a request to apply radio link monitoring (RLM) or beam failure detection (BFD) relaxation based at least in part on a determination that the relaxation criteria are satisfied.

Some aspects described herein relate to a network node for wireless communication. The network node may include memory, one or more processors coupled to the memory, and instructions stored in the memory and executable by the one or more processors. The instructions may be executable by the one or more processors to cause the network node to transmit, to a UE, configuration information including an indication of relaxation criteria. The instructions may be executable by the one or more processors to cause the network node to receive, from the UE, a request to apply RLM or BFD relaxation.

Some aspects described herein relate to a UE for wireless communication. The UE may include memory, one or more processors coupled to the memory, and instructions stored in the memory and executable by the one or more processors. The instructions may be executable by the one or more processors to cause the UE to receive, from a network node, configuration information including an indication of relaxation criteria and one or more relaxation parameters associated with RLM or BFD relaxation. The instructions may be executable by the one or more processors to cause the UE to apply RLM or BFD relaxation in accordance with the one or more relaxation parameters based at least in part on a determination that the relaxation criteria are satisfied.

Some aspects described herein relate to a method of wireless communication performed by a UE. The method may include receiving, from a network node, configuration information including an indication of relaxation criteria. The method may include transmitting, to the network node, a request to apply RLM or BFD relaxation based at least in part on a determination that the relaxation criteria are satisfied.

Some aspects described herein relate to a method of wireless communication performed by a network node. The method may include transmitting, to a UE, configuration information including an indication of relaxation criteria. The method may include receiving, from the UE, a request to apply RLM or BFD relaxation.

Some aspects described herein relate to a method of wireless communication performed by a UE. The method may include receiving, from a network node, configuration information including an indication of relaxation criteria and one or more relaxation parameters associated with RLM or BFD relaxation. The method may include applying RLM or BFD relaxation in accordance with the one or more relaxation parameters based at least in part on a determination that the relaxation criteria are satisfied.

Some aspects described herein relate to a non-transitory computer-readable medium that stores one or more instructions for wireless communication by a UE. The one or more instructions, when executed by one or more processors of the UE, May cause the UE to receive, from a network node, configuration information including an indication of relaxation criteria. The one or more instructions, when executed by one or more processors of the UE, may cause the UE to transmit, to the network node, a request to apply RLM or BFD relaxation based at least in part on a determination that the relaxation criteria are satisfied.

Some aspects described herein relate to a non-transitory computer-readable medium that stores one or more instructions for wireless communication by a network node. The one or more instructions, when executed by one or more processors of the network node, may cause the network node to transmit, to a UE, configuration information including an indication of relaxation criteria. The one or more instructions, when executed by one or more processors of the network node, may cause the network node to receive, from the UE, a request to apply RLM or BFD relaxation.

Some aspects described herein relate to a non-transitory computer-readable medium that stores one or more instructions for wireless communication by a non-transitory computer-readable medium. The one or more instructions, when executed by one or more processors of a UE, may cause the UE to receive, from a network node, configuration information including an indication of relaxation criteria and one or more relaxation parameters associated with RLM or BFD relaxation, and apply RLM or BFD relaxation in accordance with the one or more relaxation parameters based at least in part on a determination that the relaxation criteria are satisfied.

Some aspects described herein relate to an apparatus for wireless communication. The apparatus may include means for receiving, from a network node, configuration information including an indication of relaxation criteria. The apparatus may include means for transmitting, to the network node, a request to apply RLM or BFD relaxation based at least in part on a determination that the relaxation criteria are satisfied.

Some aspects described herein relate to an apparatus for wireless communication. The apparatus may include means for transmitting, to a UE, configuration information including an indication of relaxation criteria. The apparatus may include means for receiving, from the UE, a request to apply RLM or BFD relaxation.

Some aspects described herein relate to an apparatus for wireless communication. The apparatus may include means for receiving, from a network node, configuration information including an indication of relaxation criteria and one or more relaxation parameters associated with RLM or BFD relaxation. The apparatus may include means for applying RLM or BFD relaxation in accordance with the one or more relaxation parameters based at least in part on a determination that the relaxation criteria are satisfied.

Aspects generally include a method, apparatus, system, computer program product, non-transitory computer-readable medium, user equipment, base station, network entity, network node, wireless communication device, and/or processing system as substantially described herein with reference to and as illustrated by the drawings specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
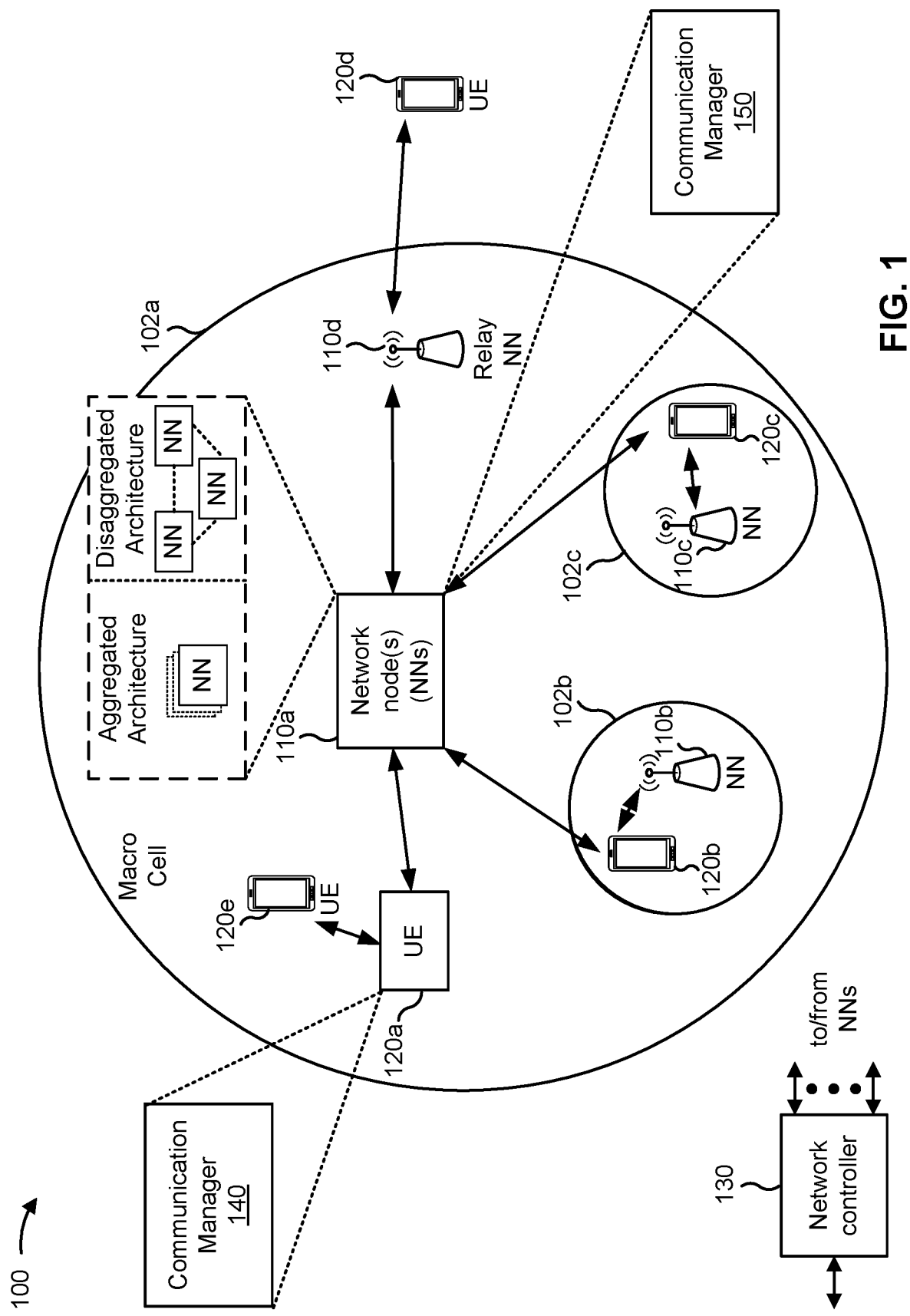
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, configuration information including an indication of relaxation criteria; and transmit, to the network node, a request to apply radio link monitoring (RLM) or beam failure detection (BFD) relaxation based at least in part on a determination that the relaxation criteria are satisfied. Additionally, or alternatively, the communication manager 140 may perform one or more other operations described herein.

In some aspects, as described in more detail elsewhere herein, the communication manager 140 may receive, from a network node, configuration information including an indication of relaxation criteria and one or more relaxation parameters associated with RLM or BFD relaxation; and apply RLM or BFD relaxation in accordance with the one or more relaxation parameters based at least in part on a determination that the relaxation criteria are satisfied. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information including an indication of relaxation criteria; and receive, from the UE, a request to apply RLM or BFD relaxation. Additionally, or alternatively, the communication manager 150 may perform one or more other operations described herein.

As indicated above, FIG. 1 is provided as an example. Other examples may differ from what is described with regard to FIG. 1.

Figure 2:
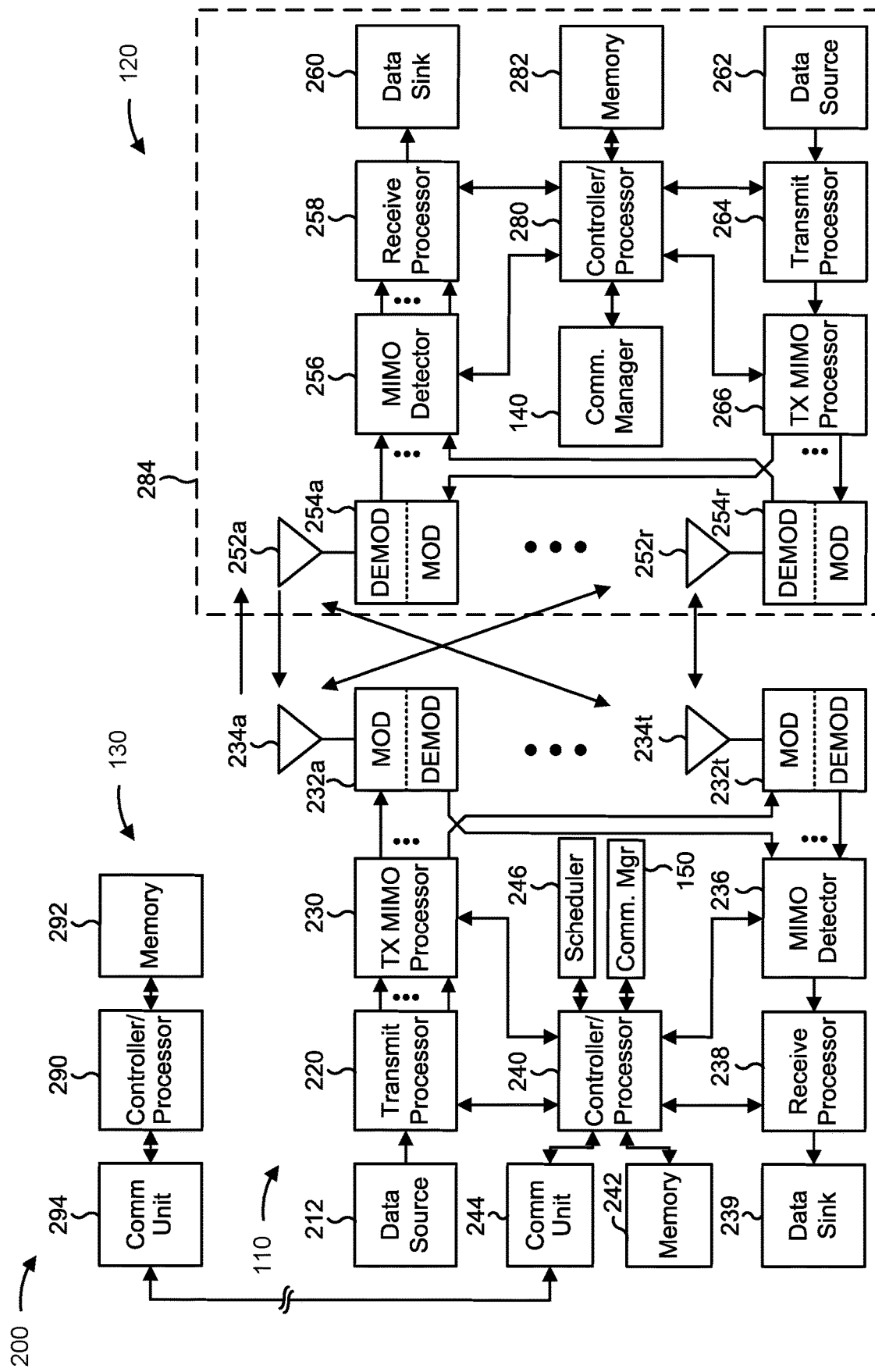
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t, and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the network node 110, the controller/processor 280 of the UE 120, and/or any other component(s) of FIG. 2 may perform one or more techniques associated with RLM or BFD relaxation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a network node, configuration information including an indication of relaxation criteria; and/or means for transmitting, to the network node, a request to apply RLM or BFD relaxation based at least in part on a determination that the relaxation criteria are satisfied. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, from a network node, configuration information including an indication of relaxation criteria and one or more relaxation parameters associated with RLM or BFD relaxation; and/or means for applying RLM or BFD relaxation in accordance with the one or more relaxation parameters based at least in part on a determination that the relaxation criteria are satisfied. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information including an indication of relaxation criteria; and/or means for receiving, from the UE, a request to apply RLM or BFD relaxation. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
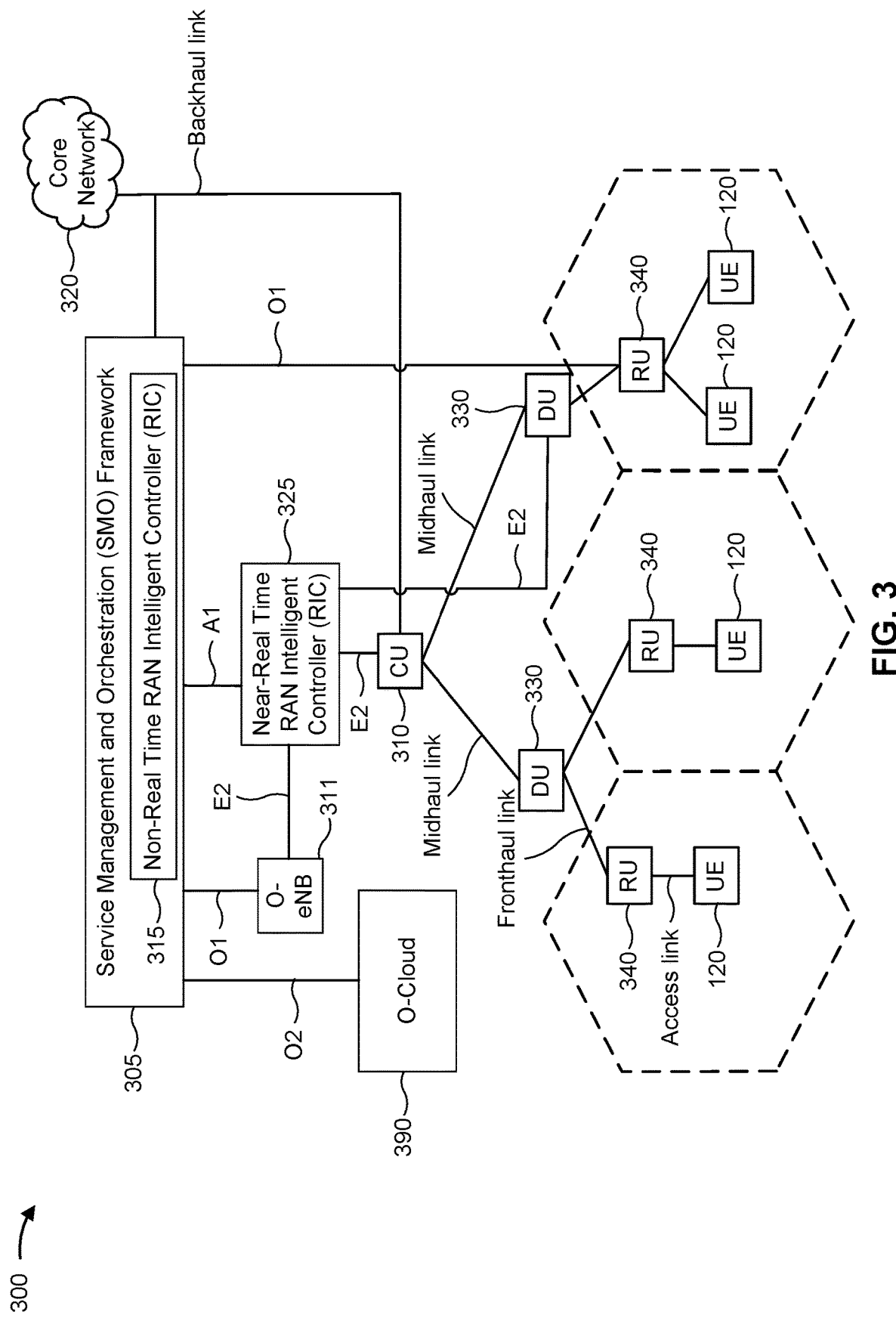
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
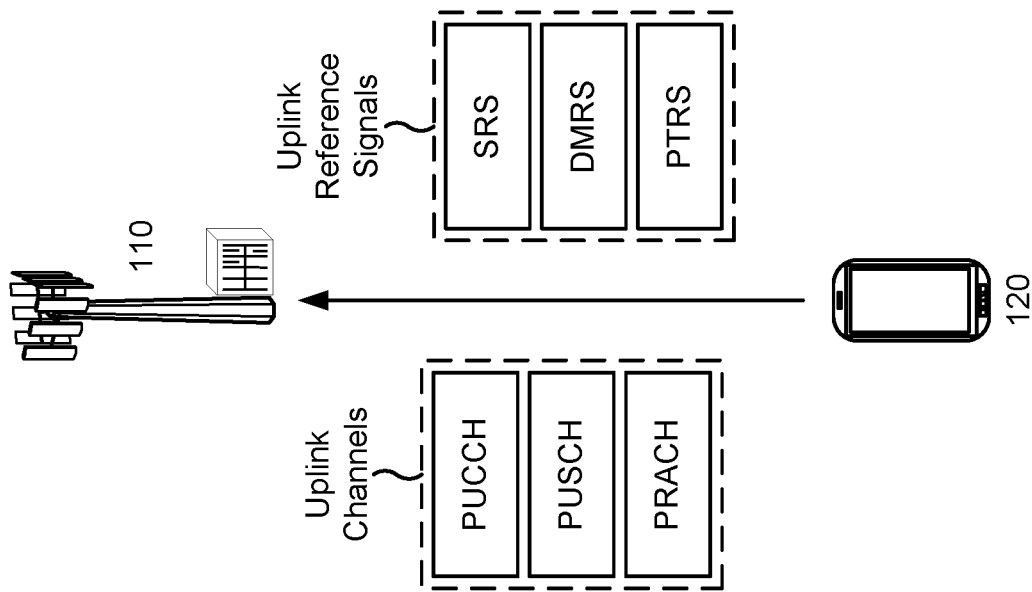
FIG. 4 is a diagram illustrating an example of physical channels and reference signals in a wireless network, in accordance with the present disclosure.
Figure 4:
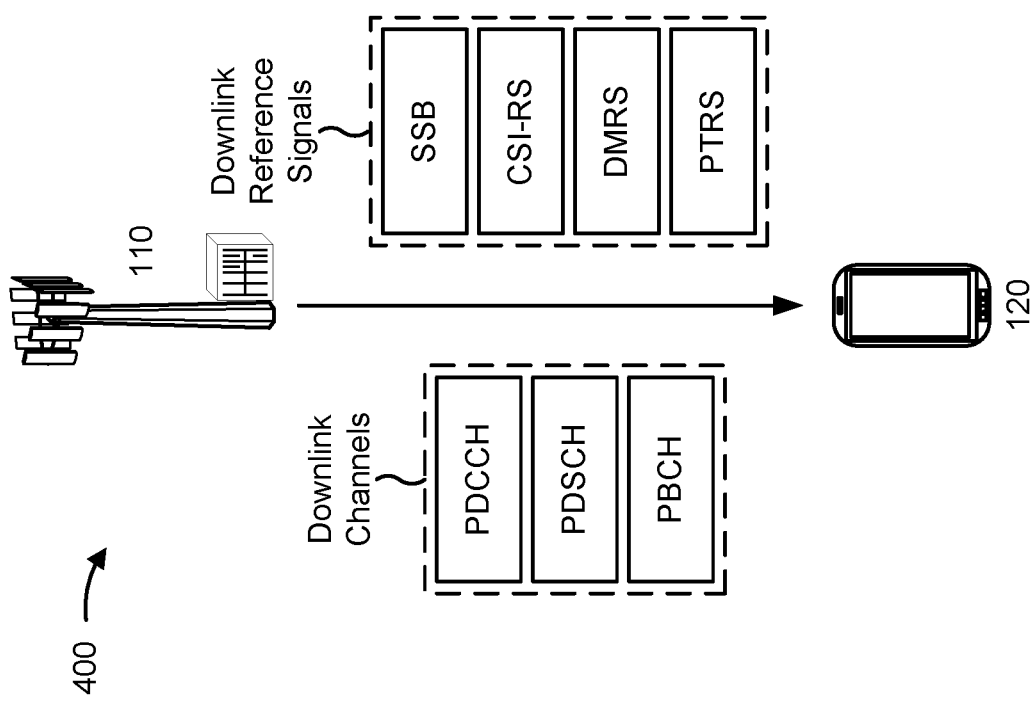

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based at least in part on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based at least in part on OTDOA measurements associated with the PRSs received from the multiple cells. In some aspects, the network node 110 may then calculate a position of the UE 120 based at least in part on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As described herein, the network node 110 and the UE 120 may perform one or more beam management procedures using one or more of the reference signals described above, including but not limited to the SSB and the CSI-RS.

As indicated above, FIG. 4 is provided as an example. Other examples may differ from what is described with regard to FIG. 4.

Figure 5:
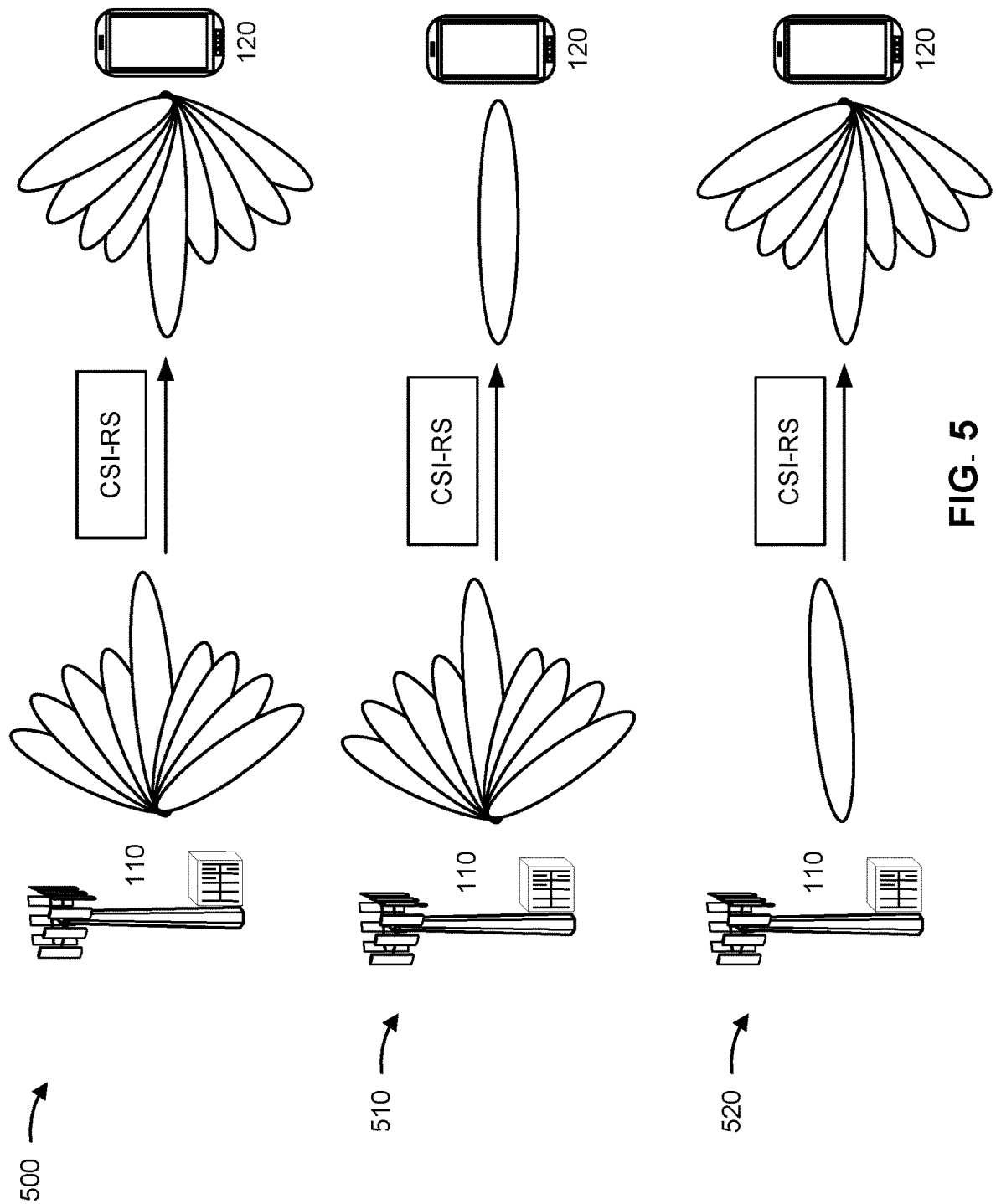
FIG. 5 is a diagram illustrating an example of beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a network node 110 in a wireless network (e.g., wireless network 100). However, the devices shown in FIG. 5 are provided as examples, and the wireless network may support communication and beam management between other devices (e.g., between a UE 120 and a network node 110 or TRP, between a mobile termination node and a control node, between an integrated access and backhaul (IAB) child node and an IAB parent node, and/or between a scheduled node and a scheduling node). In some aspects, the UE 120 and the network node 110 may be in a connected state (e.g., a radio resource control (RRC) connected state).

As shown in FIG. 5, example 500 may include a network node 110 and a UE 120 communicating to perform beam management (e.g., using CSI-RSs). Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using MAC control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same reference signal resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120.

As shown in FIG. 5, example 510 may include a network node 110 and a UE 120 communicating to perform beam management (e.g., using CSI-RSs). Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5 and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5, example 510 may include a network node 110 and a UE 120 communicating to perform beam management (e.g., using CSI-RSs). Example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

While the example beam management procedures 500, 510, and 520 have been described above in connection with CSI-RSs, the beam management procedures may be performed using one or more other reference signals, including but not limited to SSBs. For example, an SSB may carry information used for initial network acquisition and synchronization, such as a PSS, an SSS, a PBCH, and/or a PBCH DMRS. The network node 110 may transmit multiple SSBs on multiple corresponding beams, and the SSBs may be used for beam selection, in a similar manner as described above.

As described herein, a UE, such as the UE 120, may monitor a quality of one or more beams used for communicating with a network node, such as the network node 110. In some cases, the UE may perform RLM to determine a quality of the one or more beams. If the quality of the one or more beams drops below a threshold, the UE may perform (BFD and beam failure recovery (BFR) (as needed) in an attempt to recover the one or more beams.

In some cases, one or more thresholds may be defined for tracking radio link conditions. The thresholds may correspond, for example, to an RSRP and/or a block error rate (BLER) that indicates an in-sync condition and/or an out-of-sync condition of the radio link. An "out-of-sync" condition may indicate that the radio link condition is poor, whereas an "in-sync" condition may indicate that the radio link condition is acceptable, and that the UE is likely to receive a transmission transmitted on the radio link. An out-of-sync condition may be declared when the BLER for the radio link does not satisfy a threshold over a time interval (e.g., a 200 ms time interval). An in-sync condition may be declared when the BLER for the radio link satisfies a threshold over a second time interval (e.g., a 100 ms time interval). The thresholds and time intervals used to determine the in-sync condition and out-of-sync condition may be the same or may be different from each other. If the UE receives a number (e.g., greater than a threshold number) of out-of-sync measurements over a period of time, the UE may declare a beam failure.

When a beam failure is declared (e.g., detected), the UE may take appropriate actions to recover the connection. For example, after M RLM failure indications out of the last N measurement instances, the UE may trigger a radio link failure procedure to initiate recovery of the connection with the network node. In some cases, the UE May be configured by RRC signaling with a BFD procedure that is used to indicate to the network node that the beam failure has been detected. For example, an upper layer of the UE may use a state machine whose state is updated whenever a BFD indication is received from the physical (PHY) layer. A BFR procedure may be triggered based at least in part on the state machine reaching a termination state.

In some cases, the UE may be configured by a network node for discontinuous reception (DRX). During an RRC connected state, when there is no data transmission in either direction (UL/DL), the UE may transition to the DRX mode in which the UE discontinuously performs beam measurements (e.g., monitoring PDCCH channels) using a sleep and wake cycle. Without DRX, the UE may monitor the PDCCH in every subframe to check whether there is downlink data available for the UE. In contrast, in the DRX mode, when the UE is in a sleep portion of the cycle, the UE does not monitor for the PDCCH. In some cases, using DRX, the periodicity of measuring radio link quality measurements may be set to be the maximum between the shortest periodicity of reference signals in a set $q_0$ and the length of the DRX cycle for the UE. If the radio link quality measurements on all of the reference signals in the set $q_0$ drops below a threshold (e.g., $Q_{out}$), an indication may be sent from the PHY layer to the upper layer.

As described above, the UE may be configured to monitor a quality of one or more beams used for communicating with the network node. For example, the UE may use one or more reference signals, such as an SSB and/or a CSI-RS, in order to monitor one or more conditions of a beam. The UE may determine, based at least in part on the monitoring, whether the beam has a good radio link condition, such that the UE and the network node can reliably communicate using the beam, or a poor radio link condition, such that the UE and the network node may not be able to reliably communicate using the beam.

In some cases, the UE may perform RLM or BFD using the one or more reference signals in order to recover a failed beam and/or to discover a new beam for communicating with the network node. However, performing beam measurements using the one or more reference signals may require a number of resources of the UE. In particular, performing RLM or BFD using the one or more reference signals may consume battery power resources of the UE such that the battery life of the UE is reduced. This is especially true when the UE has limited battery power to begin with, such as in the example of a low-capability device. Furthermore, some devices may be stationary or substantially stationary for long periods of time, such that performing beam measurements at a relatively frequent periodicity may use significant battery power while the conditions at the UE are unlikely to change.

Some techniques and apparatuses described herein enable a UE to apply RLM and/or BFD relaxation based at least in part on relaxation criteria configured for the UE. "RLM and/or BFD relaxation" (herein, "RLM/BFD relaxation") refers to the UE reducing a periodicity/frequency of RLM/BFD reference signal measurements. In some aspects, the UE may receive, from a network node, configuration information including an indication of the relaxation criteria. The UE may transmit, to the network node, a request to apply RLM/BFD relaxation based at least in part on a determination that the relaxation criteria are satisfied. The network node may indicate, to the UE, whether the request to apply RLM/BFD relaxation is accepted or rejected. For example, the network node may transmit, to the UE, an indication to apply RLM/BFD relaxation based at least in part on receiving the request. As a result, based at least in part on the indication from the network node, the UE may reduce the periodicity/frequency of RLM/BFD reference signal measurements when the relaxation criteria are satisfied. The relaxation criteria may be configured to identify conditions (e.g., based at least in part on at least one of a mobility of the UE or a distance of the UE from the network node) for which the UE can reduce the periodicity/frequency of RLM and/or BFD reference signal measurements without significantly increasing a likelihood that the UE will experience a beam failure. Thus, by applying the RLM/BFD relaxation when the relaxation criteria are satisfied, the UE may reduce power consumption and conserve battery life without significantly increasing a likelihood that the UE will experience a beam failure. Furthermore, the signaling procedure described herein may reduce confusion between the UE and the network node as to whether the UE is to apply RLM/BFD relaxation or not.

As indicated above, FIG. 5 is provided as an example. Other examples may differ from what is described with regard to FIG. 5.

Figure 6:
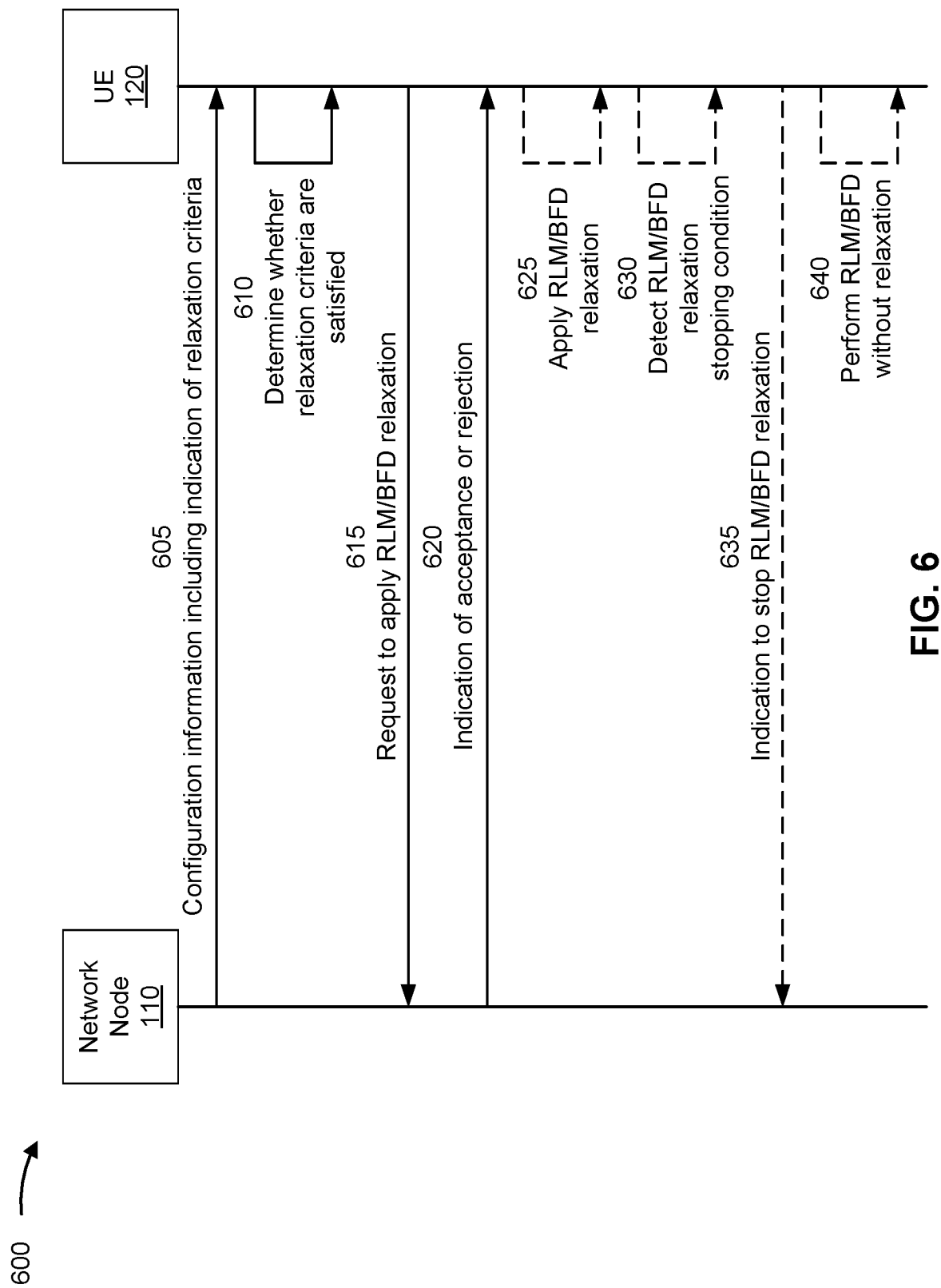
FIGS. 6-7 are diagrams illustrating examples associated with radio link monitoring (RLM) or beam failure detection (BFD) relaxation, in accordance with the present disclosure.

FIG. 6 is a diagram illustrating an example 600 associated with RLM or BFD relaxation, in accordance with the present disclosure. As shown in FIG. 6, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 6, and by reference number 605, the network node 110 may transmit, to the UE 120, configuration information including an indication of one or more relaxation criteria. The UE 120 may receive the configuration information including the indication of the relaxation criteria. In some aspects, the network node 110 may transmit the indication of the relaxation criteria to the UE 120 in an RRC message.

In some aspects, the configuration information including the indication of the relaxation criteria may also include an indication a configuration of one or more RLM/BFD reference signals to be measured by the UE 120 and a first measurement periodicity for the measurements of the RLM/BFD reference signals to be performed by the UE 120. The first measurement periodicity may be the measurement periodicity for the measurements of the RLM/BFD reference signals without RLM/BFD relaxation (e.g., a default measurement periodicity when the UE 120 is not applying RLM/BFD relaxation). The network node 110 may transmit the RLM/BFD reference signal in resources (e.g., time and frequency resources) configured for the RLM/BFD reference signals, and the UE 120 may periodically perform measurements (e.g., RSRP measurements, BLER measurement, and/or other reference signal measurements) of the RLM/BFD reference signals (e.g., with the first measurement periodicity when not applying RLM/BFD relaxation) and perform RLM and/or BFD based at least in part on the measurements of the RLM/BFD reference signals.

The relaxation criteria may identify one or more conditions in which the UE 120 may request to apply RLM/BFD relaxation. In some aspects, the relaxation criteria may include at least one of mobility criteria or distance criteria relative to a cell associated with the network node 110. The mobility criteria may be based at least in part on the UE 120 having a stable radio link, low mobility, or being a stationary UE. For example, the stability of the radio link may correspond to the UE 120 having a good and stable radio link, such that the link supports the communications between the UE 120 and the network node 110. In some aspects, the low mobility of the UE 120 may correspond to the UE 120 moving at a low speed or within a predetermined pathway within a particular location or setting. In some aspects, the stationary status of the UE 120 may correspond to whether the UE 120 is stationary or mobile. In some aspects, the distance criteria may correspond to the UE 120 being remote from a cell edge based at least in part on at least one radio resource management (RRM) measurement in a cell reselection procedure being greater than a first threshold. In some aspects, the first threshold may correspond to $S_{rxThreshold}$, where the at least one RRM measurement may correspond to Srxlev, such that the UE 120 may be remote from the cell edge when the at least one RRM measurement is greater than the first threshold (e.g., $S_{rxlev} > S_{rxThreshold}$). In some aspects, the first threshold may correspond to $S_{qualThreshold}$, where the RRM measurement may correspond to $S_{qual}$, such that the UE 120 may be remote from the cell edge when the at least one RRM measurement is greater than the first threshold (e.g., $S_{qual} > S_{qualThreshold}$). The UE 120 being remote from the cell edge may correspond to the UE 120 not at cell edge (NACE), which may be determined based on the at least one RRM measurement in the cell reselection procedure. In some aspects, the distance criteria may correspond to the UE 120 being remote from a cell edge based at least in part on at least one Layer 1 RSRP (L1-RSRP) measurement of the one or more RLM/BFD reference signals being greater than a second threshold. In some aspects, the second threshold may correspond to at least one of Qout or $Q_{NACE}$, where the at least one L1-RSRP measurement may correspond to $Q_{RLM/BFD}$, such that the UE 120 may be remote from a cell edge (e.g., NACE) when $Q_{RLM/BFD} > \text{Qout} + Q_{NACE}$, where $Q_{NACE}$ may be configured by the network. The at least one L1-RSRP measurement may comprise at least one filtered L1-RSRP measurement averaged over a time window. For example, $Q_{RLM/BFD}$ may correspond to the time average of the at least one filtered L1-RSRP measurement of the RLM/BFD reference signals. In some aspects, the distance criteria may correspond to the UE 120 being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RLM/BFD}$) may be used on the reference signals for the RLM/BFD. In some aspects, the third threshold may correspond to Qout+$Q_{NACE}$, such that the relaxation counter is incremented by one when $Q_{RLM/BFD}$>Qout+$Q_{NACE}$.

As further shown in FIG. 6, and by reference number 610, the UE 120 may determine whether the relaxation criteria are satisfied. In some aspects, the UE 120 may periodically evaluate the relaxation criteria indicated in the configuration information. For example, the UE 120 may periodically evaluate at least one of a mobility criteria or a distance criteria. In some aspects, the UE 120 may be configured to evaluate the relaxation criteria with a same periodicity as the measurement periodicity for the RLM/BFD measurements (e.g., with the first periodicity when not applying RLM/BFD relaxation). In some aspects, the UE 120 may be configured to evaluate the relaxation criteria with a different periodicity than the measurement periodicity for the RLM/BFD measurements. In some aspects, the relaxation criteria may be associated with measurements of the RLM/BFD reference signals. For example, as described above, the distance criteria may be based at least in part on at least one L1-RSRP measurement of the one or more RLM/BFD reference signals. In some aspects, the relaxation criteria may be associated with other beam or reference signal measurements by the UE 120. For example, as described above, the distance criteria may be based at least in part on at least one RRM measurement in a cell reselection procedure. In some aspects, the UE 120 may determine that the relaxation criteria (e.g., at least one or the mobility criteria or the distance criteria) is satisfied.

As further shown in FIG. 6, and by reference number 615, based at least in part on the determination that the relaxation criteria are satisfied, the UE 120 may transmit, to the network node 110, a request to apply RLM/BFD relaxation. The network node 110 may receive, from the UE 120, the request to apply RLM/BFD relaxation. In some aspects, the request may be included in an RRC message, such as a UE assistance information (UAI) message. In some aspects, the request may be included in a MAC-CE. In some aspects, the UE 120 may include, in the request, a report of measurements of the RLM/BFD reference signals performed by the UE 120. The report of the measurements of the RLM/BFD reference signals may inform the network node 110 (and the network) of the current channel conditions between the UE 120 and the network node 110.

In some aspects, the UE 120 may select whether or not to transmit the request when the UE 120 determines that the relaxation criteria are satisfied. For example, in some aspects, the UE 120 may not be required to transmit the request when the relaxation criteria are satisfied. In this case, when the relaxation criteria are satisfied, the UE 120 may select to transmit the request to apply RLM/BFD, or not to transmit the request and continue performing measurements of the RLM/BFD reference signals at the current periodicity (e.g., the first measurement periodicity). For example, the UE 120 may select not to transmit the request based at least in part on the current channel conditions, quality of service requirements, and/or other criteria. In some aspects, the UE 120 may not be permitted to enter RLM/BFD relaxation mode in which the UE 120 applies RLM/BFD relaxation without receiving an indication from the network node 110 that enables the UE 120 to apply RLM/BFD relaxation.

As further shown in FIG. 6, and by reference number 620, the network node 110, based at least in part on receiving the request to apply RLM/BFD relaxation, may transmit an indication of acceptance or rejection to the UE 120. The UE 120 may receive the indication of the acceptance or rejection from the network node 110.

In some aspects, the network node 110 may transmit, to the UE 120, an indication of acceptance of the request to apply RLM/BFD relaxation. In this case, the network node 110 may transmit, to the UE 120, an indication to apply the RLM/BFD relaxation based at least in part on receiving the request to apply RLM/BFD relaxation. In some aspects, the indication to apply RLM/BFD relaxation may include an indication of one or more relaxation parameters associated with the RLM/BFD relaxation to be applied by the UE 120. For example, the indication to apply RLM/BFD relaxation may be included in an RRC message that indicates a configuration for the one or more relaxation parameters. The one or more parameters may indicate a second measurement periodicity for the measurements of the RLM/BFD reference signals while the UE 120 is applying RLM/BFD relaxation. The second measurement periodicity may be a reduced measurement periodicity as compared to the first measurement periodicity for the measurements of the RLM/BFD reference signals without RLM/BFD relaxation. "Measurement periodicity" for the measurements of the RLM/BFD reference signals refers to how frequently the UE 120 performs the measurements of the RLM/BFD reference signals. That is, reducing the measurement periodicity corresponds to increasing the time period between the measurements of the RLM/BFD reference signals. In some aspects, the one or more relaxation parameters may include an explicit indication of the second measurement periodicity. In some aspects, the one or more relaxation parameters may include an indication of a scaling factor to be applied, by the UE 120, to the first measurement periodicity to determine the second measurement periodicity. In some aspects, the one or more relaxation parameters may include an indication of a maximum duration for the UE 120 to apply RLM/BFD relaxation. In some aspects, in a case in which the request includes a report of measurement of the RLM/BFD reference signals performed by the UE 120, the network node 110 may dynamically determine the one or more relaxation parameters (e.g., the second measurement periodicity, the scaling factor, and/or the maximum duration for applying RLM/BFD relaxation) based at least in part on the reported measurements of the RLM/BFD reference signals.

In some aspects, the UE 120 may be preconfigured (e.g., by configuration information received from the network node 110) with the one or more relaxation parameters prior to transmitting the request and receiving the indication to apply RLM/BFD relaxation. For example, the network node 110 may transmit the configuration of the one or more relaxation parameters (e.g., the indication of the second measurement periodicity or the scaling factor and/or the indication of the maximum duration for applying RLM/BFD relaxation) to the UE 120 in the configuration information that includes the relaxation criteria. In this case, the network node 110, based at least in part on receiving the request from the UE 120, may transmit an indication of acceptance to the UE 120 without including additional information. For example, the network node 110 may transmit a binary indication that indicates acceptance of the request to apply RLM/BFD relaxation. In some aspects, the indication of acceptance may be an RRC message, such as an RRC confirmation for the UAI message (e.g., including the request) received from the UE 120. In some aspects, the indication of acceptance may be a MAC-CE paired with the MAC-CE used by the UE 120 to transmit the request to apply RLM/BFD relaxation.

In some aspects, the network node 110 may transmit, to the UE 120, an indication rejecting the request to apply RLM/BFD relaxation. In this case, the network node 110 may transmit a binary indication that indicates rejection of the request to apply RLM/BFD relaxation. In some aspects, the indication rejecting the request may be included in an RRC message or a MAC-CE. In a case in which the UE 120 receives the indication rejecting the request to apply RLM/BFD relaxation, the UE 120 may continue performing the measurements of the RLM/BFD reference signals at the first periodicity (e.g., without applying RLM/BFD relaxation). The UE 120 may also continue to evaluate the relaxation criteria, and the UE 120 may transmit, to the network node 110, another request to apply RLM/BFD relaxation based at least in part on another determination that the relaxation criteria are satisfied.

As further shown in FIG. 6, and by reference number 625, the UE 120 may apply RLM/BFD relaxation based at least in part on receiving the indication to apply RLM/BFD relaxation (e.g., the indication of acceptance of the request) from the network node 110. The UE 120 may apply RLM/BFD relaxation by reducing the measurement periodicity for the measurements of the RLM/BFD reference signals from the first measurement periodicity to the second measurement periodicity. The reduced measurement periodicity corresponds to an increased time period between measurements of the RLM/BFD reference signals. For example, the first measurement periodicity may correspond to the UE 120 performing the measurements of the RLM/BFD reference signals every DRX cycle (e.g., when the UE 120 is not applying RLM/BFD relaxation), and second measurement periodicity may correspond to the UE 120 performing the measurements of the RLM/BFD reference signals every other or every third DRX cycle (e.g., when the UE 120 is applying RLM/BFD relaxation).

The UE 120 may apply the RLM/BFD relaxation based at least in part on the one or more relaxation parameters. For example, an indication of the one or more relaxation parameters may be included in the indication to apply RLM/BFD relaxation (e.g., the indication approving the request) received from the network node 110, or the one or more relaxation parameters may be preconfigured relaxation parameters indicated in the configuration information received from the network node 110 prior to transmitting the request. In some aspects, the second measurement periodicity may be explicitly indicated in the one or more relaxation parameters. In some aspects, the one or more relaxation parameters may include an indication of the scaling factor to be applied to the first measurement periodicity. In this case, the UE 120 may determine the second measurement periodicity by applying the scaling factor to the first measurement periodicity (e.g., by multiplying the first measurement periodicity by the scaling factor).

As further shown in FIG. 6, and by reference number 630, the UE 120 may detect an RLM/BFD relaxation stopping condition. In some aspects, the one or more relaxation parameters may include an indication of a maximum duration for applying RLM/BFD. The UE 120 may apply RLM/BFD relaxation (e.g., by reducing the measurement periodicity for the measurements of the RLM/BFD reference signals from the first measurement periodicity to the second periodicity) for a duration less than or equal to the maximum duration. In some aspects, the UE 120 may detect the RLM/BFD stopping condition based at least in part on a determination that the UE 120 has applied RLM/BFD relaxation for the maximum duration.

In some aspects, the UE 120 may continue to periodically evaluate the relaxation criteria while applying RLM/BFD relaxation (e.g., while in the RLM/BFD relaxation mode). For example, the UE 120 may evaluate the relaxation criteria with a different (e.g., reduced) periodicity or with a same periodicity while applying RLM/BFD relaxation, as compared to a periodicity of evaluating the relaxation criteria while not applying RLM/BFD relaxation. In some aspects, the UE 120 may detect the RLM/BFD stopping condition based at least in part on a determination that the relaxation criteria are no longer satisfied. In some aspects, the UE 120 may detect the RLM/BFD stopping condition based at least in part on a determination that the relaxation criteria are no longer satisfied or a determination that a maximum duration for RLM/BFD relaxation has been reached.

As further shown in FIG. 6, and by reference number 635, based at least in part on detecting the RLM/BFD stopping condition, the UE 120 may transmit, to the network node 110, an indication to stop RLM/BFD relaxation. For example, the UE 120 may indicate, to the UE 120, that the relaxation criteria are no longer satisfied or the maximum duration for RLM/BFD relaxation has been reached. In some aspects, the indication to stop RLM/BFD relaxation may be included in an RRC message, such as a UAI message. In some aspects, the indication to stop RLM/BFD relaxation may be included in a MAC-CE. In some aspects, the indication to stop RLM/BFD relaxation may include a report of measurements of the RLM/BFD reference signals performed by the UE 120. For example, the report of the measurements of the RLM/BFD reference signals may inform the network node 110 of the current channel conditions between the UE 120 and the network node 110. In some aspects, a same type of message may be used for the request to apply RLM/BFD relaxation and the indication (or request) to stop RLM/BFD relaxation.

As further shown in FIG. 6, and by reference number 640, the UE 120, in connection with transmitting the indication to stop RLM/BFD relaxation, may perform RLM and/or BFD without relaxation. In some aspects, the network node 110 may transmit an indication disabling RLM/BFD relaxation based at least in part on the indication to stop RLM/BFD relaxation received from the UE 120. In this case, the UE 120 may perform measurements of RLM/BFD reference signals without RLM/BFD relaxation based at least in part on receiving the indication disabling RLM/BFD relaxation from the network node 110.

In some aspects, in a case in which the network node 110 dynamically configures/indicates the one or more relaxation parameters in the indication approving the request to apply RLM/BFD relaxation, the network node 110 may transmit an indication of one or more reconfigured measurement parameters for measurements of the RLM/BFD reference signals without relaxation. In this case, the network node 110 may transmit the indication of the one or more reconfigured measurement parameters based at least in part on receiving, from the UE 120, the indication to stop RLM/BFD relaxation. For example, the one or more reconfigured parameters may include an indication of a reconfigured measurement periodicity for the measurements of the RLM/BFD reference signals with relaxation (e.g., a reconfigured first measurement periodicity) or a scaling factor to be applied (by the UE 120) to the second periodicity to determine a reconfigured measurement periodicity for the measurements of the RLM/BFD reference signals with relaxation (e.g., the reconfigured first measurement periodicity). In some aspects, the network node 110 may determine the reconfigured measurement periodicity and/or other reconfigured measurement parameters based on reported measurements of the RLM/BFD reference signals included in the indication to stop RLM/BFD relaxation. The UE 120 may receive the indication of one or more reconfigured measurement parameters, and the UE 120 may perform the measurements of the RLM/BFD reference signals without relaxation based at least in part on the one or more reconfigured measurement parameters.

In some aspects, such as in a case in which the UE 120 is preconfigured with the first measurement periodicity and the second measurement periodicity (or the scaling factor), the UE 120 may resume performing the measurements of the RLM/BFD reference signals with the first periodicity when no longer applying RLM/BFD relaxation (e.g., when the UE 120 exits the RLM/BFD relaxation mode).

As describe herein, the UE 120 may receive, from the network node 110, configuration information including an indication of the relaxation criteria. The UE 120 may transmit, to the network node 110, a request to apply RLM/BFD relaxation based at least in part on a determination that the relaxation criteria are satisfied. The network node 110 may indicate, to the UE 120, whether the request to apply RLM/BFD relaxation is accepted or rejected. For example, the network node 110 may transmit, to the UE 120, an indication to apply RLM/BFD relaxation based at least in part on receiving the request. As a result, based at least in part on the indication from the network node, the UE 120 may reduce the periodicity/frequency of RLM/BFD reference signal measurements when the relaxation criteria are satisfied. The relaxation criteria may be configured to identify conditions (e.g., based at least in part on at least one of a mobility of the UE 120 or a distance of the UE 120 relative to a cell associated with the network node 110) for which the UE 120 can reduce the periodicity/frequency of RLM and/or BFD reference signal measurements without significantly increasing a likelihood that the UE 120 will experience a beam failure. Thus, by applying the RLM/BFD relaxation when the relaxation criteria are satisfied, the UE 120 may reduce power consumption and conserve battery life without significantly increasing a likelihood that the UE 120 will experience a beam failure. Furthermore, the signaling procedure described herein may reduce confusion between the UE 120 and the network node 110 as to whether the UE 120 is to apply RLM/BFD relaxation or not.

As indicated above, FIG. 6 is provided as an example. Other examples may differ from what is described with respect to FIG. 6.

Figure 7:
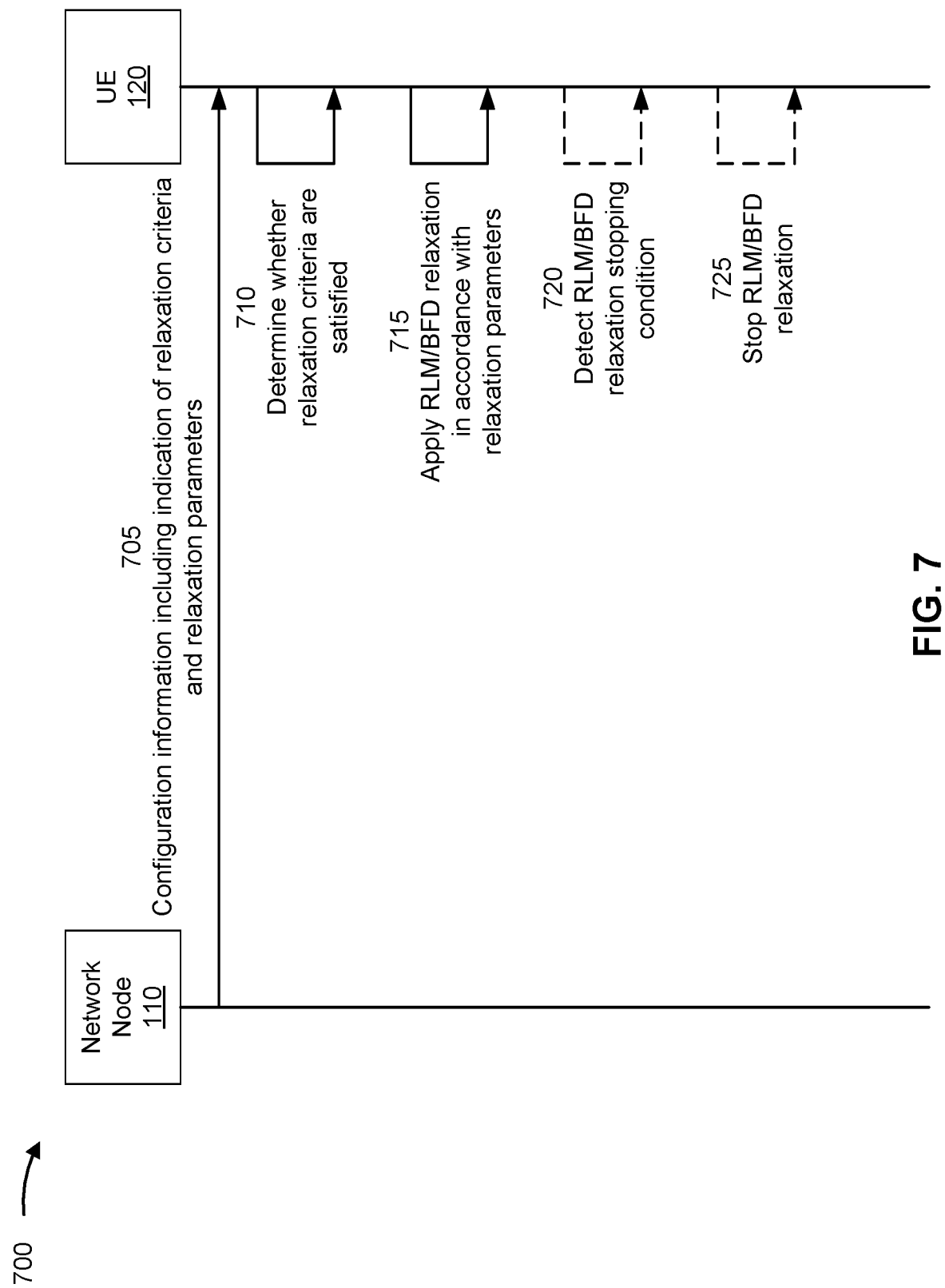

FIG. 7 is a diagram illustrating an example 700 associated with RLM or BFD relaxation, in accordance with the present disclosure. As shown in FIG. 7, example 700 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 7, and by reference number 705, the network node 110 may transmit, to the UE 120, configuration information including an indication of one or more relaxation criteria and one or more relaxation parameters associated with RLM/BFD relaxation. The UE 120 may receive the configuration information including the indication of the relaxation criteria and the one or more relaxation parameters. In some aspects, the network node 110 may transmit the indication of the relaxation criteria and the one or more relaxation parameters to the UE 120 in an RRC message.

In some aspects, the configuration information including the indication of the relaxation criteria and the one or more relaxation parameters may also include an indication of a configuration of one or more RLM/BFD reference signals to be measured by the UE 120 and a first measurement periodicity for the measurements of the RLM/BFD reference signals to be performed by the UE 120. The first measurement periodicity may be the measurement periodicity for the measurements of the RLM/BFD reference signals without RLM/BFD relaxation (e.g., a default measurement periodicity when the UE 120 is not applying RLM/BFD relaxation). The network node 110 may transmit the RLM/BFD reference signal in resources (e.g., time and frequency resources) configured for the RLM/BFD resources, and the UE 120 may periodically perform measurements (e.g., RSRP measurements, BLER measurement, and/or other reference signal measurements) of the RLM/BFD reference signals (e.g., with the first measurement periodicity when not applying RLM/BFD relaxation) and perform RLM and/or BFD based at least in part on the measurements of the RLM/BFD reference signals.

The one or more relaxation parameters may indicate a second measurement periodicity for the measurements of the RLM/BFD reference signals while the UE 120 is applying RLM/BFD relaxation. The second measurement periodicity may be a reduced measurement periodicity as compared to the first measurement periodicity for the measurements of the RLM/BFD reference signals without RLM/BFD relaxation. For example, the second measurement periodicity may correspond to a longer time period between the measurements of the RLM/BFD reference signals, as compared with the first measurement periodicity. In some aspects, the one or more relaxation parameters may include an explicit indication of the second measurement periodicity. In some aspects, the one or more relaxation parameters may include an indication of a scaling factor to be applied, by the UE 120, to the first measurement periodicity to determine the second measurement periodicity. In some aspects, the one or more relaxation parameters may include an indication of a maximum duration for the UE 120 to apply RLM/BFD relaxation.

The relaxation criteria may identify one or more conditions in which the UE 120 may apply RLM/BFD relaxation. In some aspects, the relaxation criteria may include at least one of a mobility criteria or a distance criteria relative to a cell associated with the network node 110. The mobility criteria may be based at least in part on the UE 120 having a stable radio link, low mobility, or being a stationary UE. For example, the stability of the radio link may correspond to the UE 120 having a good and stable radio link, such that the link supports the communications between the UE 120 and the network node 110. In some aspects, the low mobility of the UE 120 may correspond to the UE 120 moving at a low speed or within a predetermined pathway within a particular location or setting. In some aspects, the stationary status of the UE 120 may correspond to whether the UE 120 is stationary or mobile. In some aspects, the distance criteria may correspond to the UE 120 being remote from a cell edge based at least in part on at least one radio resource management (RRM) measurement in a cell reselection procedure being greater than a first threshold. In some aspects, the first threshold may correspond to $S_{rxThreshold}$, where the at least one RRM measurement may correspond to $S_{rxlev}$, such that the UE 120 may be remote from the cell edge when the at least one RRM measurement is greater than the first threshold (e.g., $S_{rxlev} > S_{rxThreshold}$). In some aspects, the first threshold may correspond to $S_{qualThreshold}$, where the RRM measurement may correspond to $S_{qual}$, such that the UE 120 may be remote from the cell edge when the at least one RRM measurement is greater than the first threshold (e.g., $S_{qual} > S_{qualThreshold}$). The UE 120 being remote from the cell edge may correspond to the UE 120 not at cell edge (NACE), which may be determined based on the at least one RRM measurement in the cell reselection procedure. In some aspects, the distance criteria may correspond to the UE 120 being remote from a cell edge based at least in part on at least one Layer 1 RSRP (L1-RSRP) measurement of the one or more RLM/BFD reference signals being greater than a second threshold. In some aspects, the second threshold may correspond to at least one of Qout or $Q_{NACE}$, where the at least one L1-RSRP measurement may correspond to $Q_{RLM/BFD}$, such that the UE 120 may be remote from a cell edge (e.g., NACE) when $Q_{RLM/BFD} >$ Qout+$Q_{NACE}$, where $Q_{NACE}$ may be configured by the network. The at least one L1-RSRP measurement may comprise at least one filtered L1-RSRP measurement averaged over a time window. For example, $Q_{RLM/BFD}$ may correspond to the time average of the at least one filtered L1-RSRP measurement of the RLM/BFD reference signals. In some aspects, the distance criteria may correspond to the UE 120 being remote from a cell edge (e.g., NACE) based at least in part on at least one L1-RSRP measurement of the one or more reference signals for the RLM procedure or the BFD procedure being greater than a third threshold. A relaxation counter may be incremented by one when the at least one L1-RSRP measurement is greater than the third threshold. A counter, instead of time averaging, of the at least one L1-RSRP measurement (e.g., $Q_{RLM/BFD}$) may be used on the reference signals for the RLM/BFD. In some aspects, the third threshold may correspond to Qout+$Q_{NACE}$, such that the relaxation counter is incremented by one when $Q_{RLM/BFD} >$ Qout+$Q_{NACE}$.

As further shown in FIG. 7, and by reference number 710, the UE 120 may determine whether the relaxation criteria are satisfied. In some aspects, the UE 120 may periodically evaluate the relaxation criteria indicated in the configuration information. For example, the UE 120 may periodically evaluate at least one of a mobility criteria or a distance criteria. In some aspects, the UE 120 may be configured to evaluate the relaxation criteria with a same periodicity as the measurement periodicity for the RLM/BFD measurements (e.g., with the first periodicity when not applying RLM/BFD relaxation). In some aspects, the UE 120 may be configured to evaluate the relaxation criteria with a different periodicity than the measurement periodicity for the RLM/BFD measurements. In some aspects, the relaxation criteria may be associated with measurements of the RLM/BFD reference signals. For example, as described above, the distance criteria may be based at least in part on at least one L1-RSRP measurement of the one or more RLM/BFD reference signals. In some aspects, the relaxation criteria may be associated with other beam or reference signal measurements by the UE 120. For example, as described above, the distance criteria may be based at least in part on at least one RRM measurement in a cell reselection procedure. In some aspects, the UE 120 may determine that the relaxation criteria (e.g., at least one or the mobility criteria or the distance criteria) is satisfied.

As further shown in FIG. 7, and by reference number 715, the UE 120, based at least in part on the determination that the relaxation criteria are satisfied, may apply RLM/BFD relaxation in accordance with the relaxation parameters. The UE 120 may apply RLM/BFD relaxation by reducing the measurement periodicity for the measurements of the RLM/BFD reference signals from the first measurement periodicity to the second measurement periodicity. The reduced measurement periodicity corresponds to an increased time period between measurements of the RLM/BFD reference signals. The UE 120 may apply the RLM/BFD relaxation in accordance with the one or more relaxation parameters indicated in the configuration information. In some aspects, the UE 120 the second measurement periodicity may be explicitly indicated in the one or more relaxation parameters. In some aspects, the one or more relaxation parameters may include an indication of the scaling factor to be applied to the first measurement periodicity. In this case, the UE 120 may determine the second measurement periodicity by applying the scaling factor to the first measurement periodicity (e.g., by multiplying the first measurement periodicity by the scaling factor).

In some aspects, the UE 120 may apply RLM/BFD relaxation, based at least in part on the determination that the relaxation criteria are satisfied, without transmitting, to the network node 110, an indication associated with applying RLM/BFD relaxation. For example, no signaling to the network node 110 (or network) may be required for the UE 120 to enter an RLM/BFD relaxation mode upon determining that the relaxation criteria are satisfied. In other aspects, the UE 120 may transmit an indication to the network node 110 based at least in part on the determination that the relaxation criteria are satisfied (e.g., such as the request described above in connection with reference number 610 of FIG. 6). For example, the indication may be included in an RRC message, such as a UAI message, or a MAC-CE.

In some aspects, presence/absence of the relaxation criteria and/or the relaxation parameters may indicate whether the network enables/disables RLM/BFD relaxation for the UE. In some aspects, the presence of the relaxation criteria and/or the relaxation parameters in the configuration information may enable the UE 120 to apply RLM/BFD without any further signaling with the network node 110. In some aspects, the absence of the relaxation criteria and/or the relaxation parameters in the configuration information may disable RLM/BFD relaxation for the UE 120. In some aspects, the UE 120 may select whether or not to apply RLM/BFD relaxation when the UE 120 determines that the relaxation criteria are satisfied. For example, in some aspects, the UE 120 may not be required to apply RLM/BFD relaxation when the relaxation criteria are satisfied.

As further shown in FIG. 7, and by reference number 720, the UE 120 may detect an RLM/BFD relaxation stopping condition. In some aspects, the one or more relaxation parameters may include an indication of a maximum duration for applying RLM/BFD. The UE 120 may apply RLM/BFD relaxation (e.g., by reducing the measurement periodicity for the measurements of the RLM/BFD reference signals from the first measurement periodicity to the second periodicity) for a duration less than or equal to the maximum duration. In some aspects, the UE 120 may detect the RLM/BFD stopping condition based at least in part on a determination that the UE 120 has applied RLM/BFD relaxation for the maximum duration.

In some aspects, the UE 120 may continue to periodically evaluate the relaxation criteria while applying RLM/BFD relaxation (e.g., while in the RLM/BFD relaxation mode). For example, the UE 120 may evaluate the relaxation criteria with a different (e.g., reduced) periodicity or with a same periodicity while applying RLM/BFD relaxation, as compared to a periodicity of evaluating the relaxation criteria while not applying RLM/BFD relaxation. In some aspects, the UE 120 may detect the RLM/BFD stopping condition based at least in part on a determination that the relaxation criteria are no longer satisfied.

In some aspects, the UE 120 may detect the RLM/BFD stopping condition based at least in part on determination that the relaxation criteria are no longer satisfied or a determination that a maximum duration for RLM/BFD relaxation has been reached. For example, the UE 120 may apply the RLM/BFD relaxation in accordance with the one or more relaxation parameters until the relaxation criteria are no longer satisfied or until the maximum duration for applying RLM/BFD relaxation passes.

As further shown in FIG. 7, and by reference number 725, the UE 120, based at least in part on detecting the RLM/BFD relaxation stopping condition, may stop applying RLM/BFD relaxation. The UE 120 may then perform RLM and/or BFD without relaxation. In some aspects, the UE 120 may resume performing the measurements of the RLM/BFD reference signals with the first periodicity when no longer applying RLM/BFD relaxation (e.g., when the UE 120 exits the RLM/BFD relaxation mode).

In some aspects, the UE 120 may end RLM/BFD relaxation, based at least in part on detecting the RLM/BFD relaxation stopping condition (e.g., determining that the relaxation criteria are no longer satisfied or that the maximum duration for applying RLM/BFD relaxation has passed), without transmitting, to the network node 110, an indication associated with ending RLM/BFD relaxation. For example, no signaling to the network node 110 (or network) may be required for the UE 120 to exit the RLM/BFD relaxation mode upon determining that the relaxation criteria are no longer satisfied or that the maximum duration for applying RLM/BFD relaxation has passed. In other aspects, the UE 120 may transmit, to the network node 110, an indication to stop RLM/BFD relaxation based at least in part on detecting the RLM/BFD stopping condition (e.g., determining that the relaxation criteria are no longer satisfied or that the maximum duration for applying RLM/BFD relaxation has passed), as described above in connection with reference number 635 of FIG. 6). For example, the indication to stop RLM/BFD relaxation may be included in an RRC message, such as a UAI message, or a MAC-CE.

As describe herein, the UE 120 may receive, from the network node 110, configuration information including an indication of the relaxation criteria and the one or more relaxation parameters. The UE 120 may apply RLM/BFD relaxation in accordance with the relaxation parameters based at least in part on a determination that the relaxation criteria are satisfied. As a result, the UE 120 may reduce the periodicity/frequency of RLM/BFD reference signal measurements when the relaxation criteria are satisfied. The relaxation criteria may be configured to identify conditions (e.g., based at least in part on at least one of a mobility of the UE 120 or a distance of the UE 120 relative to a cell associated with the network node 110) for which the UE 120 can reduce the periodicity/frequency of RLM and/or BFD reference signal measurements without significantly increasing a likelihood that the UE 120 will experience a beam failure. Thus, by applying the RLM/BFD relaxation when the relaxation criteria are satisfied, the UE 120 may reduce power consumption and conserve battery life without significantly increasing a likelihood that the UE 120 will experience a beam failure. Furthermore, the UE 120 may be enabled to enter and exit an RLM/BFD mode without signaling to the network node 110, which may reduce signaling overhead associated with RLM/BFD relaxation.

As indicated above, FIG. 7 is provided as an example. Other examples may differ from what is described with respect to FIG. 7.

Figure 8:
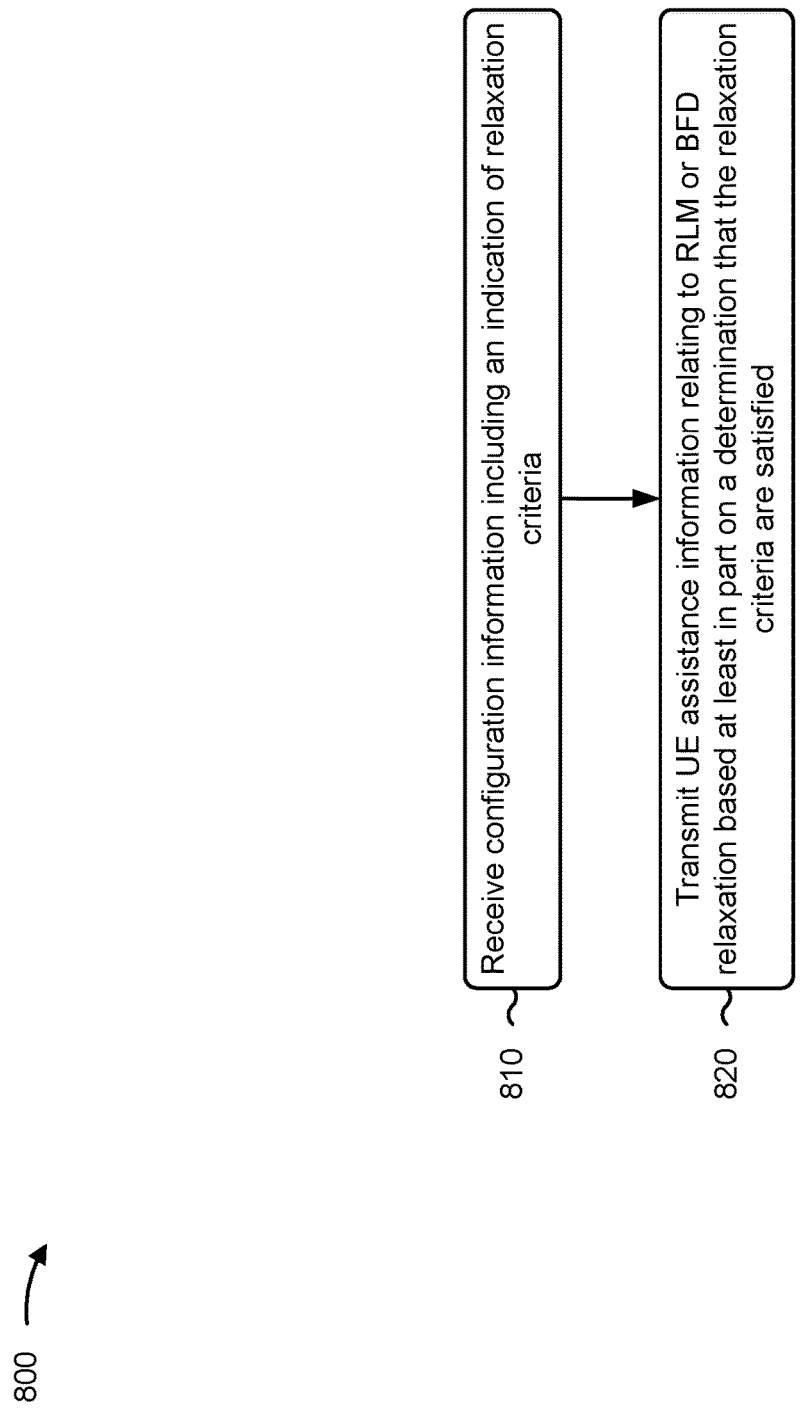
FIGS. 8-10 are diagrams illustrating example processes associated with RLM or BFD relaxation, in accordance with the present disclosure.

FIG. 8 is a diagram illustrating an example process 800 performed, for example, by a UE, in accordance with the present disclosure. Example process 800 is an example where the UE (e.g., UE 120) performs operations associated with RLM or BFD relaxation.

As shown in FIG. 8, in some aspects, process 800 may include receiving, from a network node, configuration information including an indication of relaxation criteria (block 810). For example, the UE (e.g., using communication manager 140 and/or reception component 1102, depicted in FIG. 11) may receive, from a network node, configuration information including an indication of relaxation criteria, as described above.

As further shown in FIG. 8, in some aspects, process 800 may include transmitting, to the network node, UE assistance information relating to RLM or BFD relaxation based at least in part on a determination that the relaxation criteria are satisfied (block 820). For example, the UE (e.g., using communication manager 140 and/or transmission component 1104, depicted in FIG. 11) may transmit, to the network node, a request to apply RLM or BFD relaxation based at least in part on a determination that the relaxation criteria are satisfied, as described above.

Process 800 may include additional aspects, such as any single aspect or any combination of aspects described below and/or in connection with one or more other processes described elsewhere herein.

In a first aspect, process 800 includes applying RLM or BFD relaxation based at least in part on a determination that the relaxation criteria are satisfied.

In a second aspect, alone or in combination with the first aspect, the UE assistance information is included in an RRC message.

In a third aspect, alone or in combination with one or more of the first and second aspects, the UE assistance information includes a request to apply RLM or BFD relaxation.

In a fourth aspect, alone or in combination with one or more of the first through third aspects, the request includes an indication of measurements of one or more RLM or BFD reference signals.

In a fifth aspect, alone or in combination with one or more of the first through fourth aspects, process 800 includes receiving, from the network node and in connection with the transmitting the request, an indication to apply RLM or BFD relaxation, and applying RLM or BFD relaxation in connection with the receiving the indication to apply RLM or BFD relaxation.

In a sixth aspect, alone or in combination with one or more of the first through fifth aspects, applying the RLM or BFD relaxation includes reducing a measurement periodicity for measurements of one or more RLM or BFD reference signals from a first measurement periodicity to a second measurement periodicity based at least in part on one or more relaxation parameters.

In a seventh aspect, alone or in combination with one or more of the first through sixth aspects, the one or more relaxation parameters include an indication of a scaling factor to be applied to the first measurement periodicity to determine the second measurement periodicity.

In an eighth aspect, alone or in combination with one or more of the first through seventh aspects, the one or more relaxation parameters include an indication of the second measurement periodicity.

In a ninth aspect, alone or in combination with one or more of the first through eighth aspects, the one or more relaxation parameters are included in the indication to apply RLM or BFD relaxation.

In a tenth aspect, alone or in combination with one or more of the first through ninth aspects, the one or more relaxation parameters are included in the configuration information.

In an eleventh aspect, alone or in combination with one or more of the first through tenth aspects, the indication to apply RLM or BFD relaxation includes a binary indication to apply RLM or BFD relaxation.

In a twelfth aspect, alone or in combination with one or more of the first through eleventh aspects, the one or more relaxation parameters include a maximum duration for applying RLM or BFD relaxation, and the reducing the measurement periodicity for the measurements of the one or more RLM or BFD reference signals includes reducing the measurement periodicity for the measurements of the one or more RLM or BFD reference signals from the first measurement periodicity to the second measurement periodicity for a duration less than or equal to the maximum duration for applying RLM or BFD relaxation.

In a thirteenth aspect, alone or in combination with one or more of the first through twelfth aspects, the indication to apply RLM or BFD relaxation is included in one of an RRC message or a MAC-CE.

In a fourteenth aspect, alone or in combination with one or more of the first through thirteenth aspects, process 800 includes transmitting, to the network node, an indication to end RLM or BFD relaxation based at least in part on a determination that the relaxation criteria are no longer satisfied.

In a fifteenth aspect, alone or in combination with one or more of the first through fourteenth aspects, the indication to end RLM or BFD relaxation is included in one of an RRC message or a MAC-CE.

In a sixteenth aspect, alone or in combination with one or more of the first through fifteenth aspects, process 800 includes receiving, from the network node and in connection with the transmitting the indication to end RLM or BFD relaxation, an indication of one or more reconfigured measurement parameters for measurements of one or more RLM or BFD reference signals.

In a seventeenth aspect, alone or in combination with one or more of the first through sixteenth aspects, process 800 includes receiving, from the network node, an indication rejecting the request to apply RLM or BFD relaxation.

In an eighteenth aspect, alone or in combination with one or more of the first through seventeenth aspects, the indication rejecting the request to apply RLM or BFD relaxation is included in one of an RRC message or a MAC-CE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
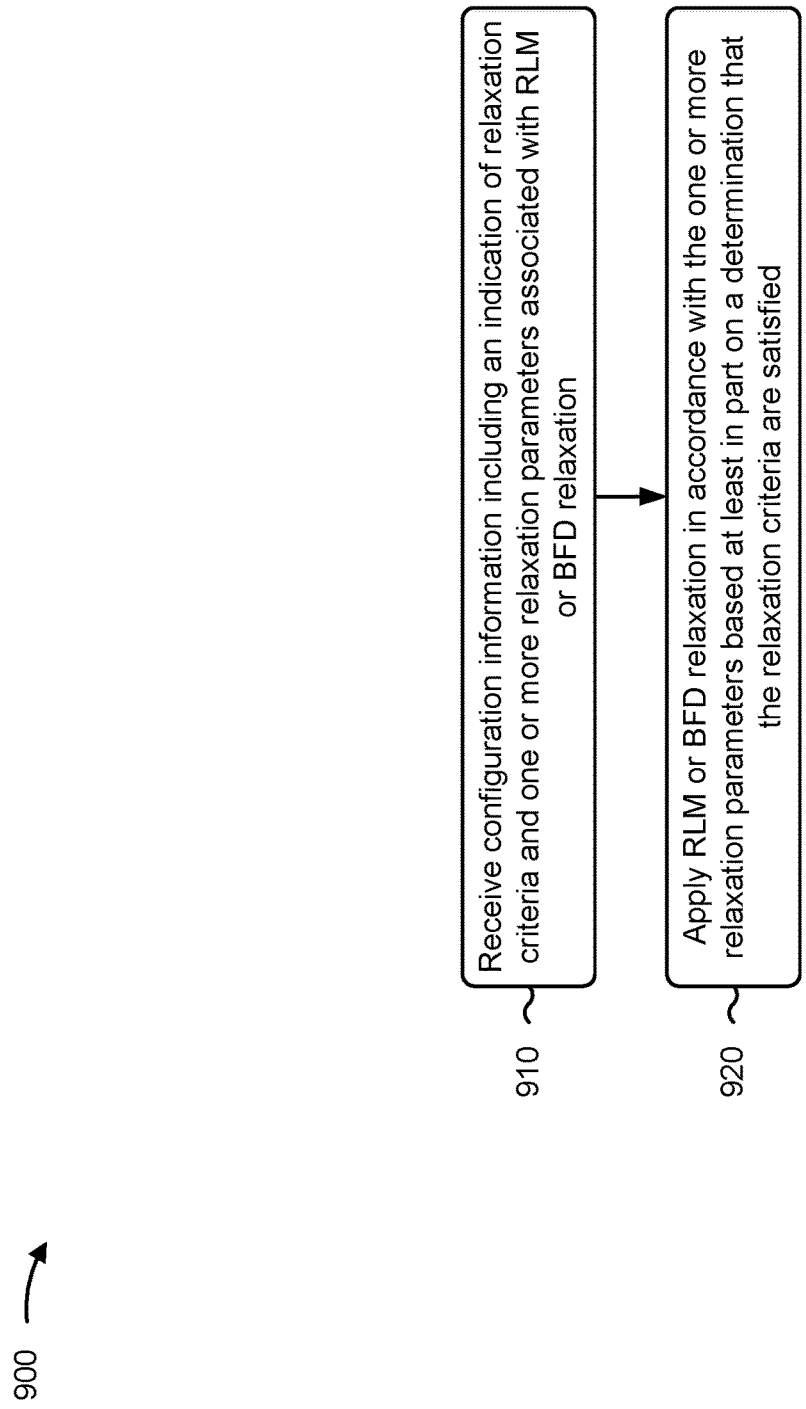

FIG. 9 is a diagram illustrating an example process 900 performed, for example, by a UE, in accordance with the present disclosure. Example process 900 is an example where the UE (e.g., UE 120) performs operations associated with RLM or BFD relaxation.

As shown in FIG. 9, in some aspects, process 900 may include receiving, from a network node, configuration information including an indication of relaxation criteria and one or more relaxation parameters associated with RLM or BFD relaxation (block 910). For example, the UE (e.g., using communication manager 140 and/or reception component 1102, depicted in FIG. 11) may receive, from a network node, configuration information including an indication of relaxation criteria and one or more relaxation parameters associated with RLM or BFD relaxation, as described above.

As further shown in FIG. 9, in some aspects, process 900 may include applying RLM or BFD relaxation in accordance with the one or more relaxation parameters based at least in part on a determination that the relaxation criteria are satisfied (block 920). For example, the UE (e.g., using communication manager 140 and/or relaxation component 1108, depicted in FIG. 11) may apply RLM or BFD relaxation in accordance with the one or more relaxation parameters based at least in part on a determination that the relaxation criteria are satisfied, as described above.

Process 900 may include additional aspects, such as any single aspect or any combination of aspects described below and/or in connection with one or more other processes described elsewhere herein.

In a first aspect, applying the RLM or BFD relaxation includes reducing a measurement periodicity for measurements of one or more RLM or BFD reference signals from a first measurement periodicity to a second measurement periodicity based at least in part on one or more relaxation parameters.

In a second aspect, alone or in combination with the first aspect, the one or more relaxation parameters include an indication of a scaling factor to be applied to the first measurement periodicity to determine the second measurement periodicity.

In a third aspect, alone or in combination with one or more of the first and second aspects, the one or more relaxation parameters include an indication of the second measurement periodicity.

In a fourth aspect, alone or in combination with one or more of the first through third aspects, the one or more relaxation parameters include a maximum duration for applying RLM or BFD relaxation.

In a fifth aspect, alone or in combination with one or more of the first through fourth aspects, applying the RLM or BFD relaxation in accordance with the one or more relaxation parameters includes applying the RLM or BFD relaxation in accordance with the one or more relaxation parameters until the relaxation criteria are no longer satisfied or until the maximum duration for applying RLM or BFD relaxation passes.

In a sixth aspect, alone or in combination with one or more of the first through fifth aspects, process 900 includes ending RLM or BFD relaxation, based at least in part on a determination that the relaxation criteria are no longer satisfied or a determination that the maximum duration for applying RLM or BFD relaxation has passed, without transmitting an indication associated with ending RLM or BFD relaxation to the network node.

In a seventh aspect, alone or in combination with one or more of the first through sixth aspects, applying the RLM or BFD relaxation in accordance with the one or more relaxation parameters includes applying RLM or BFD relaxation in accordance with the one or more relaxation parameters based at least in part on the determination that the relaxation criteria are satisfied, without transmitting an indication associated with applying RLM or BFD relaxation to the network node.

In an eighth aspect, alone or in combination with one or more of the first through seventh aspects, process 900 includes transmitting, to the network node, an indication based at least in part on the determination that the relaxation criteria are satisfied.

In a ninth aspect, alone or in combination with one or more of the first through eighth aspects, the indication based at least in part on the determination that the relaxation criteria are satisfied is included in a UE assistance information message.

In a tenth aspect, alone or in combination with one or more of the first through ninth aspects, applying the RLM or BFD relaxation in accordance with the one or more relaxation parameters includes applying the RLM or BFD relaxation in accordance with the one or more relaxation parameters until the relaxation criteria are no longer satisfied.

In an eleventh aspect, or in combination with one or more of the first through tenth aspects, process 900 includes transmitting, to the network node, an indication to end the RLM or BFD relaxation based at least in part on the determination that the relaxation criteria are no longer satisfied.

In a twelfth aspect, alone or in combination with one or more of the first through eleventh aspects, the indication to end the RLM or BFD relaxation is included in a UE assistance information message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
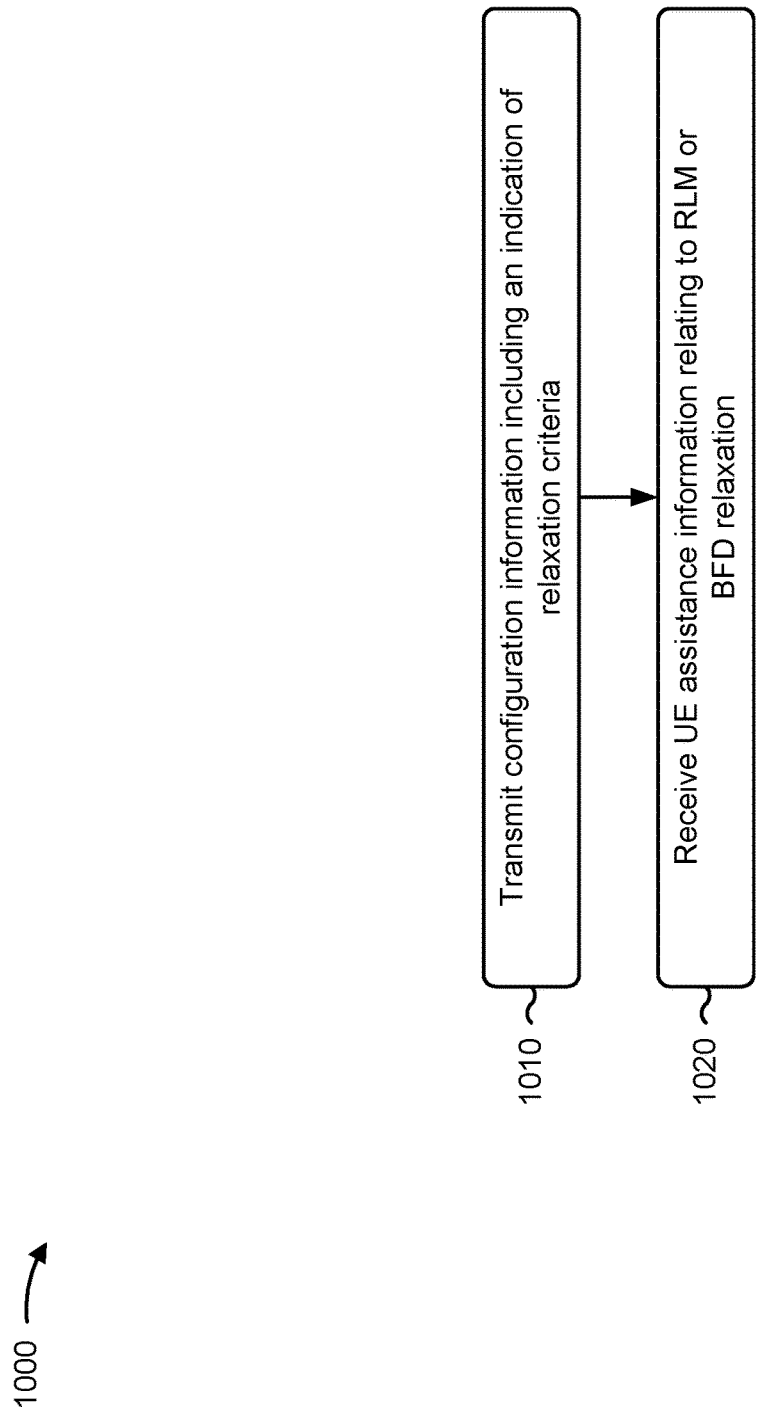

FIG. 10 is a diagram illustrating an example process 1000 performed, for example, by a network node, in accordance with the present disclosure. Example process 1000 is an example where the network node (e.g., network node 110) performs operations associated with RLM or BFD relaxation.

As shown in FIG. 10, in some aspects, process 1000 may include transmitting, to a UE, configuration information including an indication of relaxation criteria (block 1010). For example, the network node (e.g., using communication manager 150 and/or transmission component 1204, depicted in FIG. 12) may transmit, to a UE, configuration information including an indication of relaxation criteria, as described above.

As further shown in FIG. 10, in some aspects, process 1000 may include receiving, from the UE, UE assistance information relating to RLM or BFD relaxation (block 1020). For example, the network node (e.g., using communication manager 150 and/or reception component 1202, depicted in FIG. 12) may receive, from the UE, UE assistance information relating to RLM or BFD relaxation, as described above.

Process 1000 may include additional aspects, such as any single aspect or any combination of aspects described below and/or in connection with one or more other processes described elsewhere herein.

In a first aspect, the UE assistance information is included in an RRC.

In a second aspect, alone or in combination with the first aspect, the UE assistance information includes a request to apply RLM or BFD relaxation.

In a third aspect, alone or in combination with one or more of the first and second aspects, the request includes an indication of measurements of one or more RLM or BFD reference signals.

In a fourth aspect, alone or in combination with one or more of the first through third aspects, process 1000 includes transmitting, to the UE and based at least in part on receiving the request, an indication to apply RLM or BFD relaxation.

In a fifth aspect, alone or in combination with one or more of the first through fourth aspects, process 1000 includes transmitting, to the UE, an indication of one or more relaxation parameters associated with RLM or BFD relaxation.

In a sixth aspect, alone or in combination with one or more of the first through fifth aspects, the one or more relaxation parameters include an indication of a scaling factor to be applied to a first measurement periodicity for measurements of one or more RLM or BFD reference signals without RLM or BFD relaxation to determine a second measurement periodicity for measurements of the RLM or BFD reference signals by the UE while applying RLM or BFD relaxation.

In a seventh aspect, alone or in combination with one or more of the first through sixth aspects, the one or more relaxation parameters include an indication of a measurement periodicity for measurements of one or more RLM or BFD reference signals by the UE while applying RLM or BFD relaxation.

In an eighth aspect, alone or in combination with one or more of the first through seventh aspects, the one or more relaxation parameters are included in the indication to apply RLM or BFD relaxation.

In a ninth aspect, alone or in combination with one or more of the first through eighth aspects, the one or more relaxation parameters are included in the configuration information.

In a tenth aspect, alone or in combination with one or more of the first through ninth aspects, the indication to apply RLM or BFD relaxation includes a binary indication to apply RLM or BFD relaxation.

In an eleventh aspect, alone or in combination with one or more of the first through tenth aspects, the one or more relaxation parameters include a maximum duration for the UE to apply RLM or BFD relaxation.

In a twelfth aspect, alone or in combination with one or more of the first through eleventh aspects, the indication to apply RLM or BFD relaxation is included in one of an RRC message or a MAC-CE.

In a thirteenth aspect, alone or in combination with one or more of the first through twelfth aspects, process 1000 includes receiving, from the UE, an indication to end RLM or BFD relaxation.

In a fourteenth aspect, alone or in combination with one or more of the first through thirteenth aspects, the indication to end RLM or BFD relaxation is included in one of an RRC message or a MAC-CE.

In a fifteenth aspect, alone or in combination with one or more of the first through fourteenth aspects, process 1000 includes transmitting, to the UE and based at least in part on the receiving the indication to end RLM or BFD relaxation, an indication of one or more reconfigured measurement parameters for measurements of one or more RLM or BFD reference signals.

In a sixteenth aspect, alone or in combination with one or more of the first through fifteenth aspects, process 1000 includes transmitting, to the UE, an indication rejecting the request to apply RLM or BFD relaxation.

In a seventeenth aspect, alone or in combination with one or more of the first through sixteenth aspects, the indication rejecting the request to apply RLM or BFD relaxation is included in one of an RRC message or a MAC-CE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
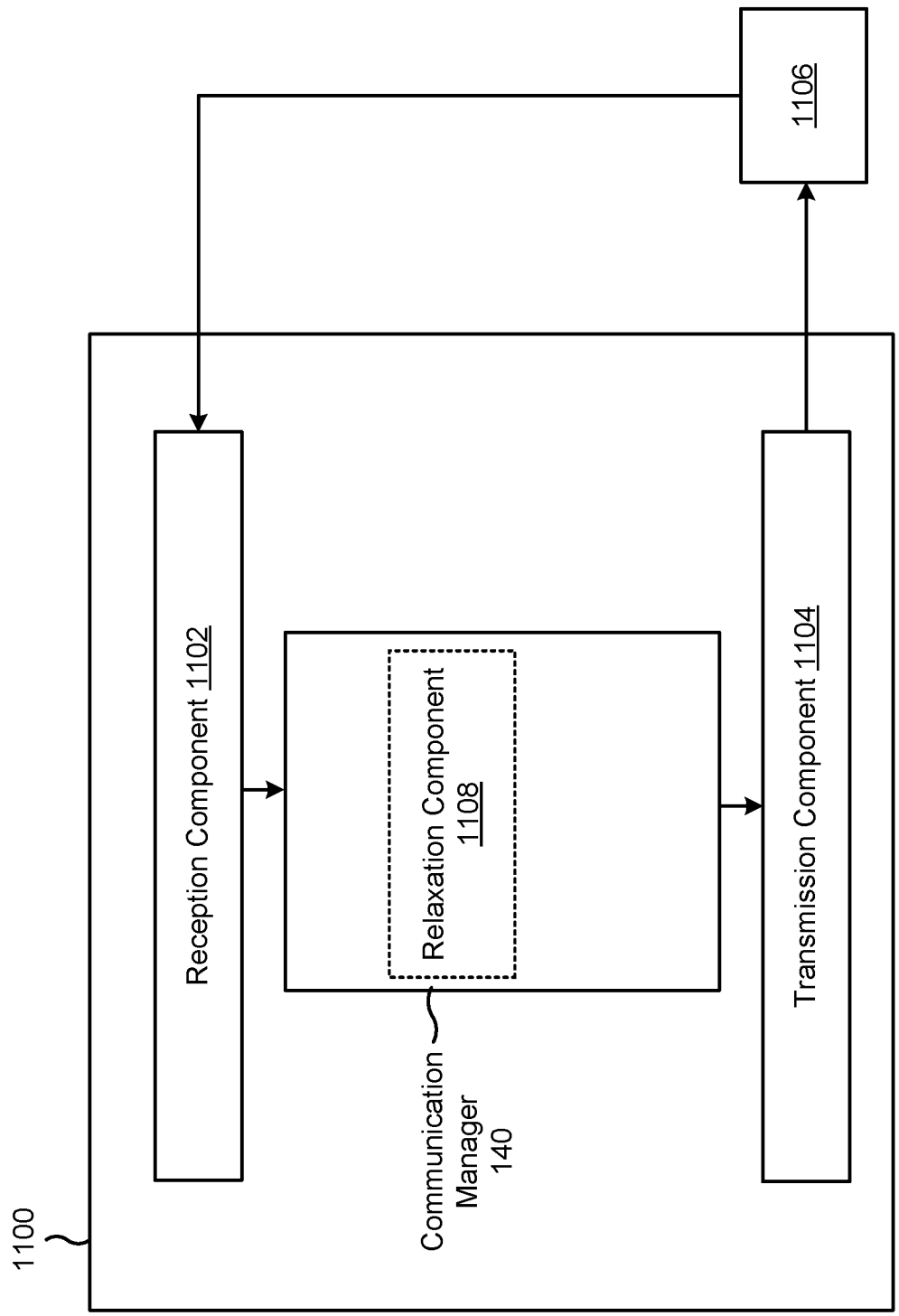
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 140. The communication manager 140 may include a relaxation component 1108, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a network node, configuration information including an indication of relaxation criteria. The transmission component 1104 may transmit, to the network node, UE assistance information relating to RLM or BFD relaxation based at least in part on a determination that the relaxation criteria are satisfied.

The relaxation component 1108 may apply RLM or BFD relaxation based at least in part on the determination that the relaxation criteria are satisfied.

In some aspects, the UE assistance information may include a request to apply RLM or BFD relaxation. The reception component 1102 may receive, from the network node and in connection with the transmitting the request, an indication to apply RLM or BFD relaxation.

The relaxation component 1108 may apply RLM or BFD relaxation in connection with the receiving the indication to apply RLM or BFD relaxation.

The transmission component 1104 may transmit, to the network node, an indication to end RLM or BFD relaxation based at least in part on a determination that the relaxation criteria are no longer satisfied.

The reception component 1102 may receive, from the network node and in connection with the transmitting the indication to end RLM or BFD relaxation, an indication of one or more reconfigured measurement parameters for measurements of one or more RLM or BFD reference signals.

The reception component 1102 may receive, from the network node, an indication rejecting the request to apply RLM or BFD relaxation.

The reception component 1102 may receive, from a network node, configuration information including an indication of relaxation criteria and one or more relaxation parameters associated with RLM or BFD relaxation. The relaxation component 1108 may apply RLM or BFD relaxation in accordance with the one or more relaxation parameters based at least in part on a determination that the relaxation criteria are satisfied.

The relaxation component 1108 may end RLM or BFD relaxation, based at least in part on a determination that the relaxation criteria are no longer satisfied or a determination that the maximum duration for applying RLM or BFD relaxation has passed, without transmitting an indication associated with ending RLM or BFD relaxation to the network node.

The transmission component 1104 may transmit, to the network node, an indication based at least in part on the determination that the relaxation criteria are satisfied.

The transmission component 1104 may transmit, to the network node, an indication to end the RLM or BFD relaxation based at least in part on the determination that the relaxation criteria are no longer satisfied.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
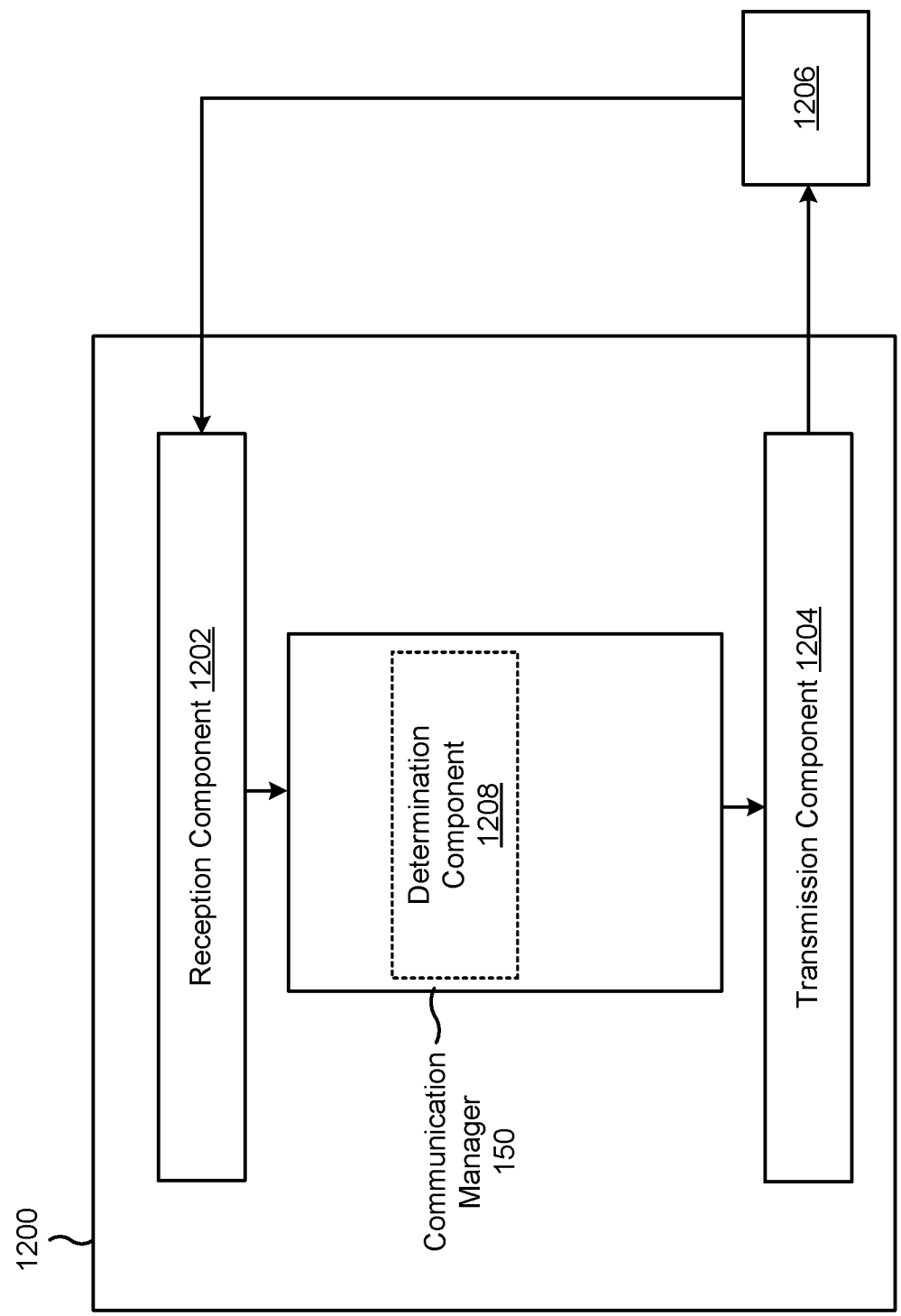

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit, to a UE, configuration information including an indication of relaxation criteria. The reception component 1202 may receive, from the UE, a UE assistance information relating to RLM or BFD relaxation.

In some aspects, the UE assistance information may include a request to apply RLM or BFD relaxation. The transmission component 1204 may transmit, to the UE and based at least in part on receiving the request, an indication to apply RLM or BFD relaxation.

The transmission component 1204 may transmit, to the UE, an indication of one or more relaxation parameters associated with RLM or BFD relaxation.

The determination component 1208 may determine the one or more relaxation parameters and/or the relaxation criteria.

The reception component 1202 may receive, from the UE, an indication to end RLM or BFD relaxation.

The transmission component 1204 may transmit, to the UE and based at least in part on the receiving the indication to end RLM or BFD relaxation, an indication of one or more reconfigured measurement parameters for measurements of one or more RLM or BFD reference signals.

The transmission component 1204 may transmit, to the UE, an indication rejecting the request to apply RLM or BFD relaxation.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a network node, configuration information including an indication of relaxation criteria; and transmitting, to the network node, a request to apply radio link monitoring (RLM) or beam failure detection (BFD) relaxation based at least in part on a determination that the relaxation criteria are satisfied.

Aspect 2: The method of Aspect 1, further comprising: applying RLM or BFD relaxation based at least in part on the determination that the relaxation criteria are satisfied.

Aspect 3: The method of any of Aspects 1-2, wherein the UE assistance information is included in a radio resource control (RRC) message.

Aspect 4: The method of any of Aspects 1-3, wherein the UE assistance information includes a request to apply RLM or BFD relaxation.

Aspect 5: The method of Aspect 4, wherein the request includes an indication of measurements of one or more RLM or BFD reference signals.

Aspect 6: The method of any of Aspects 4-5, further comprising: receiving, from the network node and in connection with the transmitting the request, an indication to apply RLM or BFD relaxation; and applying RLM or BFD relaxation in connection with the receiving the indication to apply RLM or BFD relaxation.

Aspect 7: The method of any of Aspects 2 and 6, wherein the applying RLM or BFD relaxation comprises: reducing a measurement periodicity for measurements of one or more RLM or BFD reference signals from a first measurement periodicity to a second measurement periodicity based at least in part on one or more relaxation parameters.

Aspect 8: The method of Aspect 7, wherein the one or more relaxation parameters include an indication of a scaling factor to be applied to the first measurement periodicity to determine the second measurement periodicity.

Aspect 9: The method of Aspect 7, wherein the one or more relaxation parameters include an indication of the second measurement periodicity.

Aspect 10: The method of any of Aspects 7-9, wherein the one or more relaxation parameters are included in the indication to apply RLM or BFD relaxation.

Aspect 11: The method of any of Aspects 7-9, wherein the one or more relaxation parameters are included in the configuration information.

Aspect 12: The method of Aspect 11, wherein the indication to apply RLM or BFD relaxation includes a binary indication to apply RLM or BFD relaxation.

Aspect 13: The method of any of Aspects 7-12, wherein the one or more relaxation parameters include a maximum duration for applying RLM or BFD relaxation, and wherein the reducing the measurement periodicity for the measurements of the one or more RLM or BFD reference signals comprises: reducing the measurement periodicity for the measurements of the one or more RLM or BFD reference signals from the first measurement periodicity to the second measurement periodicity for a duration less than or equal to the maximum duration for applying RLM or BFD relaxation.

Aspect 14: The method of any of Aspects 6-13, wherein the indication to apply RLM or BFD relaxation is included in one of a radio resource control (RRC) message or a medium access control (MAC) control element (MAC-CE).

Aspect 15: The method of any of Aspects 1-14, further comprising: transmitting, to the network node, an indication to end RLM or BFD relaxation based at least in part on a determination that the relaxation criteria are no longer satisfied.

Aspect 16: The method of Aspect 15, wherein the indication to end RLM or BFD relaxation is included in one of a radio resource control (RRC) message or a medium access control (MAC) control element (MAC-CE).

Aspect 17: The method of any of Aspects 15-16, further comprising: receiving, from the network node and in connection with the transmitting the indication to end RLM or BFD relaxation, an indication of one or more reconfigured measurement parameters for measurements of one or more RLM or BFD reference signals.

Aspect 18: The method of Aspect 4, further comprising: receiving, from the network node, an indication rejecting the request to apply RLM or BFD relaxation.

Aspect 19: The method of Aspect 18, wherein the indication rejecting the request to apply RLM or BFD relaxation is included in one of a radio resource control (RRC) message or a medium access control (MAC) control element (MAC-CE).

Aspect 20: A method of wireless communication performed by a network node, comprising: transmitting, to a user equipment (UE), configuration information including an indication of relaxation criteria; and receiving, from the UE, UE assistance information relating to radio link monitoring (RLM) or beam failure detection (BFD) relaxation.

Aspect 21: The method of Aspect 20, wherein the UE assistance information is included in a radio resource control (RRC) message.

Aspect 22: The method of any of Aspects 20-21, wherein the UE assistance information includes a request to apply RLM or BFD relaxation.

Aspect 23: The method of Aspect 22, wherein the request includes an indication of measurements of one or more RLM or BFD reference signals.

Aspect 24: The method of any of Aspects 22-23, further comprising: transmitting, to the UE and based at least in part on receiving the request, an indication to apply RLM or BFD relaxation.

Aspect 25: The method of any of Aspects 20-24, further comprising: transmitting, to the UE, an indication of one or more relaxation parameters associated with RLM or BFD relaxation.

Aspect 26: The method of Aspect 25, wherein the one or more relaxation parameters include an indication of a scaling factor to be applied to a first measurement periodicity for measurements of one or more RLM or BFD reference signals without RLM or BFD relaxation to determine a second measurement periodicity for measurements of the RLM or BFD reference signals by the UE while applying RLM or BFD relaxation.

Aspect 27: The method of Aspect 25, wherein the one or more relaxation parameters include an indication of a measurement periodicity for measurements of one or more RLM or BFD reference signals by the UE while applying RLM or BFD relaxation.

Aspect 28: The method of any of Aspects 25-27, wherein the one or more relaxation parameters are included in the indication to apply RLM or BFD relaxation.

Aspect 29: The method of any of Aspects 25-27, wherein the one or more relaxation parameters are included in the configuration information.

Aspect 30: The method of Aspect 29, wherein the indication to apply RLM or BFD relaxation includes a binary indication to apply RLM or BFD relaxation.

Aspect 31: The method of any of Aspects 25-30, wherein the one or more relaxation parameters include a maximum duration for the UE to apply RLM or BFD relaxation.

Aspect 32: The method of any of Aspects 24-31, wherein the indication to apply RLM or BFD relaxation is included in one of a radio resource control (RRC) message or a medium access control (MAC) control element (MAC-CE).

Aspect 33: The method of any of Aspects 20-32, further comprising: receiving, from the UE, an indication to end RLM or BFD relaxation.

Aspect 34: The method of Aspect 33, wherein the indication to end RLM or BFD relaxation is included in one of a radio resource control (RRC) message or a medium access control (MAC) control element (MAC-CE).

Aspect 35: The method of any of Aspects 33-34, further comprising: transmitting, to the UE and based at least in part on the receiving the indication to end RLM or BFD relaxation, an indication of one or more reconfigured measurement parameters for measurements of one or more RLM or BFD reference signals.

Aspect 36: The method of Aspect 22, further comprising: transmitting, to the UE, an indication rejecting the request to apply RLM or BFD relaxation.

Aspect 37: The method of Aspect 36, wherein the indication rejecting the request to apply RLM or BFD relaxation is included in one of a radio resource control (RRC) message or a medium access control (MAC) control element (MAC-CE).

Aspect 38: A method of wireless communication performed by a user equipment (UE), comprising: receiving, from a network node, configuration information including an indication of relaxation criteria and one or more relaxation parameters associated with radio link monitoring (RLM) or beam failure detection (BFD) relaxation; and applying RLM or BFD relaxation in accordance with the one or more relaxation parameters based at least in part on a determination that the relaxation criteria are satisfied.

Aspect 39: The method of Aspect 38, wherein the applying RLM or BFD relaxation comprises: reducing a measurement periodicity for measurements of one or more RLM or BFD reference signals from a first measurement periodicity to a second measurement periodicity based at least in part on the one or more relaxation parameters.

Aspect 40: The method of Aspect 39, wherein the one or more relaxation parameters include an indication of a scaling factor to be applied to the first measurement periodicity to determine the second measurement periodicity.

Aspect 41: The method of Aspect 39, wherein the one or more relaxation parameters include an indication of the second measurement periodicity.

Aspect 42: The method of any of Aspects 38-41, wherein the one or more relaxation parameters include a maximum duration for applying RLM or BFD relaxation.

Aspect 43: The method of Aspect 42, wherein the applying RLM or BFD relaxation in accordance with the one or more relaxation parameters comprises: applying the RLM or BFD relaxation in accordance with the one or more relaxation parameters until the relaxation criteria are no longer satisfied or until the maximum duration for applying RLM or BFD relaxation passes.

Aspect 44: The method of Aspect 43, further comprising: ending RLM or BFD relaxation, based at least in part on a determination that the relaxation criteria are no longer satisfied or a determination that the maximum duration for applying RLM or BFD relaxation has passed, without transmitting an indication associated with ending RLM or BFD relaxation to the network node.

Aspect 45: The method of any of Aspects 38-44, wherein the applying RLM or BFD relaxation in accordance with the one or more relaxation parameters comprises: applying RLM or BFD relaxation in accordance with the one or more relaxation parameters based at least in part on the determination that the relaxation criteria are satisfied, without transmitting an indication associated with applying RLM or BFD relaxation to the network node.

Aspect 46: The method of any of Aspects 38-43, further comprising: transmitting, to the network node, an indication based at least in part on the determination that the relaxation criteria are satisfied.

Aspect 47: The method of Aspect 46, wherein the indication based at least in part on the determination that the relaxation criteria are satisfied is included in a UE assistance information message.

Aspect 48: The method of any of Aspects 38-47, wherein the applying RLM or BFD relaxation in accordance with the one or more relaxation parameters comprises: applying the RLM or BFD relaxation in accordance with the one or more relaxation parameters until the relaxation criteria are no longer satisfied.

Aspect 49: The method of Aspect 48, further comprising: transmitting, to the network node, an indication to end the RLM or BFD relaxation based at least in part on the determination that the relaxation criteria are no longer satisfied.

Aspect 50: The method of Aspect 49, wherein the indication to end the RLM or BFD relaxation is included in a UE assistance information message.

Aspect 51: An apparatus for wireless communication at a device, comprising a processor; memory coupled with the processor; and instructions stored in the memory and executable by the processor to cause the apparatus to perform the method of one or more of Aspects 1-19.

Aspect 52: A device for wireless communication, comprising a memory and one or more processors coupled to the memory, the one or more processors configured to perform the method of one or more of Aspects 1-19.

Aspect 53: An apparatus for wireless communication, comprising at least one means for performing the method of one or more of Aspects 1-19.

Aspect 54: A non-transitory computer-readable medium storing code for wireless communication, the code comprising instructions executable by a processor to perform the method of one or more of Aspects 1-19.

Aspect 55: A non-transitory computer-readable medium storing a set of instructions for wireless communication, the set of instructions comprising one or more instructions that, when executed by one or more processors of a device, cause the device to perform the method of one or more of Aspects 1-19.

Aspect 56: An apparatus for wireless communication at a device, comprising a processor; memory coupled with the processor; and instructions stored in the memory and executable by the processor to cause the apparatus to perform the method of one or more of Aspects 20-37.

Aspect 57: A device for wireless communication, comprising a memory and one or more processors coupled to the memory, the one or more processors configured to perform the method of one or more of Aspects 20-37.

Aspect 58: An apparatus for wireless communication, comprising at least one means for performing the method of one or more of Aspects 20-37.

Aspect 59: A non-transitory computer-readable medium storing code for wireless communication, the code comprising instructions executable by a processor to perform the method of one or more of Aspects 20-37.

Aspect 60: A non-transitory computer-readable medium storing a set of instructions for wireless communication, the set of instructions comprising one or more instructions that, when executed by one or more processors of a device, cause the device to perform the method of one or more of Aspects 20-37.

Aspect 61: An apparatus for wireless communication at a device, comprising a processor; memory coupled with the processor; and instructions stored in the memory and executable by the processor to cause the apparatus to perform the method of one or more of Aspects 38-50.

Aspect 62: A device for wireless communication, comprising a memory and one or more processors coupled to the memory, the one or more processors configured to perform the method of one or more of Aspects 38-50.

Aspect 63: An apparatus for wireless communication, comprising at least one means for performing the method of one or more of Aspects 38-50.

Aspect 64: A non-transitory computer-readable medium storing code for wireless communication, the code comprising instructions executable by a processor to perform the method of one or more of Aspects 38-50.

Aspect 65: A non-transitory computer-readable medium storing a set of instructions for wireless communication, the set of instructions comprising one or more instructions that, when executed by one or more processors of a device, cause the device to perform the method of one or more of Aspects 38-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A UE for wireless communication, comprising:
one or more memories; and
one or more processors coupled to the one or more memories, the one or more memories storing instructions configurable to be executed by the one or more processors to cause the UE to:
receive, from a network node, configuration information including an indication of relaxation criteria and one or more relaxation parameters associated with radio link monitoring (RLM) or beam failure detection (BFD) relaxation;
apply RLM or BFD relaxation in accordance with the one or more relaxation parameters based at least in part on a determination that the relaxation criteria are satisfied; and
transmit, to the network node, an indication associated with ending the RLM or BFD relaxation based at least in part on a determination that the relaxation criteria are no longer satisfied.

2. The UE of claim 1, wherein the instructions configurable to be executed, when applying RLM or BFD relaxation, are further executable by the one or more processors to cause the UE to:
reduce a measurement periodicity for measurements of one or more RLM or BFD reference signals from a first measurement periodicity to a second measurement periodicity based at least in part on the one or more relaxation parameters.

3. The UE of claim 2, wherein the one or more relaxation parameters include an indication of a scaling factor to be applied to the first measurement periodicity to determine the second measurement periodicity.

4. The UE of claim 2, wherein the one or more relaxation parameters include an indication of the second measurement periodicity.

5. The UE of claim 1, wherein the one or more relaxation parameters include a maximum duration for applying RLM or BFD relaxation.

6. The UE of claim 5, wherein the instructions configurable to be executed, when applying RLM or BFD relaxation in accordance with the one or more relaxation parameters, are further executable by for the one or more processors to cause the UE to:
apply the RLM or BFD relaxation in accordance with the one or more relaxation parameters until the relaxation criteria are no longer satisfied or until the maximum duration for applying RLM or BFD relaxation passes.

7. The UE of claim 1, wherein the one or more memories further store instructions configurable to be executed by the one or more processors to cause the UE to:
    transmit, to the network node, an indication based at least in part on the determination that the relaxation criteria are satisfied.

8. The UE of claim 7, wherein the indication based at least in part on the determination that the relaxation criteria are satisfied is included in a UE assistance information message.

9. The UE of claim 1, wherein the instructions configurable to be executed, when applying RLM or BFD relaxation in accordance with the one or more relaxation parameters, are further executable by the one or more processors to cause the UE to:
    apply the RLM or BFD relaxation in accordance with the one or more relaxation parameters until the relaxation criteria are no longer satisfied.

10. The UE of claim 1, wherein the indication associated with ending the RLM or BFD relaxation is included in a UE assistance information message.

11. A user equipment (UE) for wireless communication, comprising:
    one or more memories; and
    one or more processors coupled to the one or more memories, the one or more memories storing instructions configurable to be executed by the one or more processors to cause the UE to:
        receive, from a network node, configuration information including an indication of relaxation criteria; and
        transmit, to the network node, UE assistance information relating to radio link monitoring (RLM) or beam failure detection (BFD) relaxation based at least in part on a determination that the relaxation criteria are satisfied; and
        transmit, to the network node, an indication associated with ending the RLM or BFD relaxation based at least in part on a determination that the relaxation criteria are no longer satisfied.

12. The UE of claim 11, wherein the UE assistance information includes a request to apply RLM or BFD relaxation, and wherein the one or more memories further store instructions configurable to be executed by the one or more processors to cause the UE to:
    receive, from the network node and in connection with transmitting the request, an indication to apply RLM or BFD relaxation; and
    apply RLM or BFD relaxation in connection with receiving the indication to apply RLM or BFD relaxation.

13. The UE of claim 11, wherein the one or more memories further store instructions configurable to be executed by the one or more processors to cause the UE to:
    apply RLM or BFD relaxation based at least in part on the determination that the relaxation criteria are satisfied.

14. The UE of claim 13, wherein the instructions configurable to be executed, when applying RLM or BFD relaxation, are further executable by the one or more processors to cause the UE to:
    reduce a measurement periodicity for measurements of one or more RLM or BFD reference signals from a first measurement periodicity to a second measurement periodicity based at least in part on one or more relaxation parameters.

15. The UE of claim 14, wherein the one or more relaxation parameters include an indication of a scaling factor to be applied to the first measurement periodicity to determine the second measurement periodicity.

16. The UE of claim 14, wherein the one or more relaxation parameters are included in the configuration information.

17. A network node for wireless communication, comprising:
    one or more memories; and
    one or more processors coupled to the one or more memories, the one or more memories storing instructions configurable to be executed by the one or more processors to cause the network node to:
        transmit, to a user equipment (UE), configuration information including an indication of relaxation criteria; and
        receive, from the UE, UE assistance information relating to radio link monitoring (RLM) or beam failure detection (BFD) relaxation; and
        receive, from the UE, an indication associated with ending the RLM or BFD relaxation based at least in part on a determination that the relaxation criteria are no longer satisfied.

18. The network node of claim 17, wherein the UE assistance information includes a request to apply RLM or BFD relaxation, and wherein the one or more memories further store instructions configurable to be executed by the one or more processors to cause the network node to:
    transmit, to the UE and based at least in part on receiving the request, an indication to apply RLM or BFD relaxation.

19. The network node of claim 17, wherein the memory further comprises instructions for the one or more processors to cause the network node to:
    transmit, to the UE, an indication of one or more relaxation parameters associated with RLM or BFD relaxation.

20. The network node of claim 19, wherein the one or more relaxation parameters include an indication of a scaling factor to be applied to a first measurement periodicity for measurements of one or more RLM or BFD reference signals without RLM or BFD relaxation to determine a second measurement periodicity for measurements of the RLM or BFD reference signals by the UE while applying RLM or BFD relaxation.

21. The network node of claim 19, wherein the one or more relaxation parameters are included in the configuration information.

22. A method of wireless communication performed by a user equipment (UE), comprising:
    receiving, from a network node, configuration information including an indication of relaxation criteria and one or more relaxation parameters associated with radio link monitoring (RLM) or beam failure detection (BFD) relaxation;
    applying RLM or BFD relaxation in accordance with the one or more relaxation parameters based at least in part on a determination that the relaxation criteria are satisfied; and
    transmitting, to the network node, an indication associated with ending the RLM or BFD relaxation based at least in part on a determination that the relaxation criteria are no longer satisfied.

23. The method of claim 22, wherein the applying RLM or BFD relaxation comprises:
    reducing a measurement periodicity for measurements of one or more RLM or BFD reference signals from a first measurement periodicity to a second measurement periodicity based at least in part on the one or more relaxation parameters.

24. The method of claim 23, wherein the one or more relaxation parameters include an indication of a scaling factor to be applied to the first measurement periodicity to determine the second measurement periodicity.

25. The method of claim 23, wherein the one or more relaxation parameters include an indication of the second measurement periodicity.

26. The method of claim 22, further comprising:
transmitting, to the network node, an indication based at least in part on the determination that the relaxation criteria are satisfied.

27. The method of claim 26, wherein the indication based at least in part on the determination that the relaxation criteria are satisfied is included in a UE assistance information message.

28. The method of claim 22, wherein the applying RLM or BFD relaxation in accordance with the one or more relaxation parameters comprises:
applying the RLM or BFD relaxation in accordance with the one or more relaxation parameters until the relaxation criteria are no longer satisfied.

29. The method of claim 22, wherein applying RLM or BFD relaxation in accordance with the one or more relaxation parameters comprises:
applying the RLM or BFD relaxation in accordance with the one or more relaxation parameters until the relaxation criteria are no longer satisfied.

30. The method of claim 22, wherein the indication associated with ending the RLM or BFD relaxation is included in a UE assistance information message.

\* \* \* \* \*